US011312630B2

United States Patent
Guo et al.

(10) Patent No.: US 11,312,630 B2
(45) Date of Patent: Apr. 26, 2022

(54) MODIFICATION METHOD FOR GRAPHENE, MODIFIED GRAPHENE, AND COMPOSITION CONTAINING GRAPHENE

(71) Applicants: TUNGHSU TECHNOLOGY GROUP CO., LTD., Beijing (CN); TUNGHSU OPTOELECTRONIC TECHNOLOGY CO., LTD.

(72) Inventors: Feng Guo, Beijing (CN); Fei Peng, Beijing (CN)

(73) Assignees: TUNGHSU TECHNOLOGY GROUP CO., LTD., Beijing (CN); TUNGHSU OPTOELECTRONIC TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 16/968,744

(22) PCT Filed: Nov. 26, 2018

(86) PCT No.: PCT/CN2018/117496
§ 371 (c)(1),
(2) Date: Aug. 10, 2020

(87) PCT Pub. No.: WO2019/153842
PCT Pub. Date: Aug. 15, 2019

(65) Prior Publication Data
US 2021/0017436 A1    Jan. 21, 2021

(30) Foreign Application Priority Data

| Feb. 8, 2018 | (CN) | 201810130161.0 |
|---|---|---|
| Jun. 22, 2018 | (CN) | 201810652084.5 |
| Jun. 22, 2018 | (CN) | 201810652085.X |
| Jun. 22, 2018 | (CN) | 201810652114.2 |
| Jun. 22, 2018 | (CN) | 201810652454.5 |
| Jun. 22, 2018 | (CN) | 201810652469.1 |
| Jun. 22, 2018 | (CN) | 201810652479.5 |
| Jun. 22, 2018 | (CN) | 201810652761.3 |
| Jun. 22, 2018 | (CN) | 201810652778.9 |
| Jun. 22, 2018 | (CN) | 201810652817.5 |
| Jun. 22, 2018 | (CN) | 201810652818.X |

(51) Int. Cl.
*C01B 32/194* (2017.01)
*C01B 32/198* (2017.01)
*C09K 5/06* (2006.01)

(52) U.S. Cl.
CPC .......... *C01B 32/194* (2017.08); *C01B 32/198* (2017.08); *C09K 5/063* (2013.01)

(58) Field of Classification Search
CPC ..... C01B 32/182; C01B 32/184; C01B 32/19; C01B 32/192; C01B 32/194; C01B 32/198; C09K 5/06; C09K 5/063; C09K 5/14; C08K 3/04; C08K 3/042
See application file for complete search history.

(56) References Cited

U.S. PATENT DOCUMENTS

| 8,257,867 | B2 * | 9/2012 | Liu | H01M 4/366 |
|---|---|---|---|---|
| | | | | 429/231.5 |
| 9,359,675 | B2 * | 6/2016 | Ivanovici | C01B 32/192 |
| 2011/0268647 | A1 | 11/2011 | Ivanovic | |
| 2016/0200580 | A1 | 7/2016 | Liu | |
| 2017/0059117 | A1 * | 3/2017 | Lee | C08K 3/00 |
| 2017/0202967 | A1 * | 7/2017 | Liu | B01J 21/08 |

FOREIGN PATENT DOCUMENTS

| CN | 102634212 A | 8/2012 |
|---|---|---|
| CN | 103131274 A | 6/2013 |
| CN | 103214848 A | 7/2013 |
| CN | 103804942 A * | 5/2014 |
| CN | 103804942 A | 5/2014 |
| CN | 104726069 A | 6/2015 |
| CN | 106268630 A | 1/2017 |
| CN | 107022119 A * | 8/2017 |
| CN | 107189360 A | 9/2017 |
| EP | 10803798 A3 | 6/2008 |
| JP | 2013530908 A | 8/2013 |
| JP | 2015-44718 A | 3/2015 |
| JP | 2016-531824 A | 10/2016 |
| WO | 2011131722 A1 | 10/2011 |
| WO | 2015031570 A1 | 3/2015 |
| WO | 2015165287 A1 | 11/2015 |
| WO | WO-2017188564 A1 * | 11/2017 ............... D01D 1/06 |

OTHER PUBLICATIONS

English language machine translation of Zhao et al. CN 103804942 A (Year: 2014).*
English language machine translation of Liu et al. CN 107022119 A (Year: 2017).*
English language machine translation of Cho et al. WO 2017/188564 A1 (Year: 2017).*
Bi, Chaogang. Synthesis and Characterization of Graphene Oxides and Their Composites. Engineering Technology I, China Master's Theses Full-Text Database, No. 7, Jul. 15, 2015, ISSN:1674-0246. pp. 33 and 27.
China Building Materials Industry Press. 3rd edition, Sep. 1, 2011 Chapter 5. Surface Modifiers and Their Applications. ISBN 978-7-80227-982-7 (English Translation Provided).

(Continued)

*Primary Examiner* — Matthew R Diaz

(74) *Attorney, Agent, or Firm* — Volpe Koenig

(57) ABSTRACT

The present invention relates to a modification method for graphene, a modified graphene and a composition containing graphene. The modification method for graphene comprises: mixing graphene oxide, a silicate ester, an inorganic alkali solution, a water-soluble polymer compound and a surfactant, followed by reacting at 10 to 50° C. for 0.1 to 10 hours, collecting and drying solid product of the reaction to obtain the modified graphene.

8 Claims, No Drawings

(56) References Cited

OTHER PUBLICATIONS

International Search Report issued in corresponding International Patent Appln No. PCT/CN2018/117496 dated Feb. 20, 2019, consisting of 8 pp. (English Translation Provided).
Written Opinion issued in corresponding International Patent Appln. No. PCT/CN2018/117496 dated Feb. 20, 2019, consisting of 4pp.
Office Action issued in corresponding Japanese Patent Application No. 2020-564989 dated Sep. 29, 2021, consisting of 15 pp. (English Translation Provided).
Search Report issued in corresponding Japanese Patent Application No. 2020-564989 dated Sep. 14, 2021, consisting of 41 pp. (English Translation Provided).
Li, et al. The situ preparation of silica nano particles on the surface of functionalized graphene nanoplatelets. Nanoscale Research Letters 204, 9:172.
Office Action issued in corresponding Korean Patent Application No. 10-2020-7025846 dated Jan. 17, 2022, consisting of 4 pp.

\* cited by examiner

MODIFICATION METHOD FOR GRAPHENE, MODIFIED GRAPHENE, AND COMPOSITION CONTAINING GRAPHENE

CROSS REFERENCE TO RELATED APPLICATIONS

The present application is a U.S. National Phase of International Patent Application Serial No. PCT/CN2018/117496 entitled "MODIFICATION METHOD FOR GRAPHENE, MODIFIED GRAPHENE AND COMPOSITION CONTAINING GRAPHENE" filed on Nov. 26, 2018, the contents of which are incorporated by reference in their entirety for all purposes.

TECHNICAL FIELD

The present invention relates to a modification method for graphene, a modified graphene and a composition containing graphene.

BACKGROUND

Graphene is a material having a benzene ring-like structure in which carbon atoms are closely arranged in two-dimensional space. It is a new allotrope of carbon besides zero-dimensional fullerene, one-dimensional carbon nanotube, three-dimensional graphite and diamond. Due to its special crystal structure and electronic structure, graphene has excellent electrical, magnetic, thermal and mechanical properties. It has great application potential in high-performance nano electronic devices, composite materials, field emission materials, sensors, transparent electrodes and energy storage. In order to make better use of these properties of graphene and make it more widely used, it is often modified to change, control and adjust its structure and performance in a directional manner. At present, the modification of graphene is mainly for the purpose of improving its processing performance and electronic performance. However, there are few reports on the modification to optimize other properties of graphene, such as thermal conductivity.

With the rapid development of computer technology, the calculation speed of the central processing unit (CPU), which is the core of the computer system, is getting faster and faster, and its heat productivity is also increasing. If the CPU has poor heat dissipation and the temperature is too high, it can easily lead to problems such as hot start and crashes during the operation of the computer. Therefore, providing a good heat dissipation system for the CPU is one of the important conditions for ensuring the normal operation of the computer. The common way to solve the heat dissipation problem of heat sources, such as CPU chips, is to install a heat sink on the heat source. However, even a smooth surface-to-surface contact between the heat source such as CPU and a heat sink inevitably has some gap, which will seriously affect the heat dissipation effect.

Thermal interface materials are widely used because they can effectively reduce the thermal resistance of the interface between the heat source and the heat sink. Thermal-conductive silicone grease is one of the most commonly used thermally conductive media. It is used to fill the gap between the heat source and the heat sink to transfer the heat from the heat source to the heat sink to keep the temperature of the heat source at a stable working level, prolong the service life of the device, and prevent the heat source from being damaged due to poor heat dissipation. The thermal-conductive silicone grease is generally prepared by mixing silicone oil and a thermally conductive filler. In the existing high-end thermal-conductive silicone grease, the thermal-conductive filler is generally silver powder and graphite material. The graphite powder in general has a thermal conductivity of 150-300 W/(M·K). The silver powder, which is expensive, has a thermal conductivity of only 429 W/(M·K) and has limited help to improve the overall thermal conductivity of the grease. In addition, in the long-term use, it often happens that silicone oil is separated from the thermal filler, resulting in the differentiation and fragmentation of thermal-conductive grease coatings, and poor thermal conductivity. However, if a high-viscosity base oil is used, it is difficult to add a thermal-conductive filler having a high solid content, resulting in that the product has poor thermal conductivity.

At present, there is not much research on thermal conductivity and heat dissipation coatings at home and abroad, and such research is limited to solvent-based coatings. For example, Chinese Patent Application No. CN200810146607.5 discloses a heat-dissipating coating and a preparation method thereof, in which silicon resin and organic solvent, together with the addition of silicon carbide, aluminum powder and zinc oxide, are used to prepare the heat-dissipating paint. Chinese Patent Application No. 201110165349.7 discloses a method for preparing high-temperature-resistant halogen-free flame-retardant UV curable solder resist ink, in which epoxy acrylic photosensitive resin, photoinitiator, epoxy resin, curing agent, filler and diluent are used to prepare a heat dissipation paint, wherein poor mixing properties of the added ink components and the inorganic thermal-conductive fillers affects the coating performance.

Phase Change Material (PCM) is a material that changes its state with temperature and can provide latent heat. As the best green carrier for energy saving and environmental protection, phase change materials are widely used in fields including construction, aerospace, electric power, communications and the like. Phase change materials mainly include inorganic PCM, organic PCM and composite PCM. Among them, inorganic PCM mainly includes crystalline hydrated salts, molten salts, metals or alloys, etc.; organic PCM mainly includes paraffin, acetic acid, and other organic substances; composite PCM is mainly a mixture of organic and inorganic eutectic phase change materials. Among these phase change materials, phase change materials with a phase transition temperature between 20 and 80° C. have good uses in heat absorption and storage, but most of them have high cost, poor heat transfer or thermal conductivity, which makes them difficult to be popularized and applied in the field of heat dissipation.

SUMMARY

An object of the present disclosure is to provide a modification method for graphene and a modified graphene, to improve the thermal conductivity and surface properties of graphene, and reduce its electrical conductivity.

Another object of the present disclosure is to provide a composition containing the modified graphene.

To achieve the above objects, the first aspect of the present disclosure provides a modification method for graphene, comprising: mixing graphene oxide, a silicate ester, an inorganic alkali solution, a water-soluble polymer compound and a surfactant, followed by reacting at 10 to 50° C. for 0.1 to 10 hours, collecting and drying solid product of the reaction to obtain the modified graphene, wherein the surfactant is at least one selected from the group consisting of cationic surfactants, anionic surfactants, nonionic surfactants, and zwitterionic surfactants.

Optionally, the surfactant is an anionic surfactant, and the weight ratio among the graphene oxide, silicate ester, inorganic alkali solution, water-soluble polymer compound and anionic surfactant is 1:(0.5-4):(0.01-2):(0.1-0.8):(0.02-0.5), preferably 1:(1.8-2.8):(0.6-1):(0.3-0.6):(0.1-0.25).

Optionally, the anionic surfactant is at least one selected from the group consisting of sodium dodecylbenzene sulfonate, sodium lignosulfonate, PAAS, P90, 610S, sodium hexametaphosphate, and sodium lauryl sulfate.

Preferably, the anionic surfactant consists of PAAS and P90, and the weight ratio between PAAS and P90 is 1:(0.5-1.2).

Alternatively, the anionic surfactant consists of sodium dodecylbenzene sulfonate and sodium lignosulfonate, and the weight ratio between sodium dodecylbenzene sulfonate and sodium lignosulfonate is 1:(1-2).

Alternatively, the anionic surfactant consists of 610S and P90, and the weight ratio between 610S and P90 is 1:(0.05-0.5).

Optionally, the surfactant is a nonionic surfactant, wherein the weight ratio among the graphene oxide, silicate ester, inorganic alkali solution, water-soluble polymer compound and anionic surfactant is 1:(0.5-4):(0.01-2):(0.05-0.5):(0.1-0.8), preferably 1:(1.8-2.8):(0.6-1):(0.08-0.25):(0.3-0.6).

Optionally, the nonionic surfactant is at least one selected from the group consisting of PVPK17, tributyl phosphate, polyvinyl alcohol, polyethylene glycol, Tween 20, and Span 80.

Preferably, the nonionic surfactant consists of PVPK17 and tributyl phosphate, and the weight ratio between PVPK17 and tributyl phosphate is 1:(1-2).

Alternatively, the nonionic surfactant consists of polyvinyl alcohol and polyethylene glycol, wherein the weight ratio between the polyvinyl alcohol and polyethylene glycol is 1:(0.1-0.6), and the weight-average molecular weight of the polyvinyl alcohol is 1,000-5,000, the weight-average molecular weight of the polyethylene glycol is 200-1,000.

Optionally, the surfactant consists of an anionic surfactant and a nonionic surfactant, wherein the weight ratio among the graphene oxide, silicate, inorganic alkali solution, water-soluble polymer compound, and surfactant is 1:(0.5-4):(0.01-2):(0.1-0.8):(0.01-0.8), preferably 1:(1.8-2.8):(0.6-1):(0.2-0.6):(0.1-0.5), and wherein the weight ratio between the anionic surfactant and the nonionic surfactant is 1:(0.001-2).

Optionally, the surfactant consists of PAAS and PVPK17, and the weight ratio between PAAS and PVPK17 is 1:(0.01-0.2).

Alternatively, the surfactant consists of P90 and polyethylene glycol, and the weight ratio between P90 and polyethylene glycol is 1:(0.5-1), and the weight-average molecular weight of the polyethylene glycol is 200-400.

Alternatively, the surfactant consists of P90 and PVPK17, and the weight ratio between P90 and PVPK17 is 1:(0.15-0.35).

Optionally, the surfactant consists of a cationic surfactant and/or a zwitterionic surfactant, wherein the weight ratio among the graphene oxide, silicate, inorganic alkali solution, water-soluble polymer compound and surfactant is 1:(0.5-6):(0.1-10):(0.02-0.5):(0.02-1), preferably 1:(1-1.5):(0.5-5):(0.1-0.3):(0.05-0.5).

Preferably, the surfactant is at least one selected from the group consisting of triethanolamine, cetyltrimethylammonium bromide, tetradecyltrimethylammonium bromide, dodecylaminopropionic acid, methyl acrylate, and alkyl dimethyl hydroxypropyl phosphate betaine.

Optionally, the silicate ester is at least one selected from the group consisting of tetramethyl orthosilicate, tetraethyl orthosilicate, isopropyl orthosilicate, and trimethylsiloxy silicate.

Preferably, the silicate ester consists of tetramethyl orthosilicate and trimethylsiloxysilicate, and the weight ratio between tetramethyl orthosilicate and trimethylsiloxysilicate is 1:(0.1-1).

Optionally, the inorganic alkali solution has a concentration of 30 to 100 g/L, and the inorganic alkali solution is at least one selected from the group consisting of sodium hydroxide solution, potassium hydroxide solution, calcium hydroxide solution, sodium carbonate solution, sodium bicarbonate solution, and potassium carbonate solution.

Optionally, the water-soluble polymer compound is at least one selected from the group consisting of polyacrylamide, polyacrylic acid, polymaleic anhydride, epoxy resin, alkyd resin, and amino resin.

Preferably, the water-soluble polymer compound is polyacrylic acid, and the water-soluble polymer compound has a weight-average molecular weight of 5,000 to 20,000.

Optionally, the method further comprises carrying out the reaction in the presence of a coupling agent, wherein the weight ratio of the graphene oxide to the coupling agent is 1:(0.5-4), and the coupling agent is a silane coupling agent.

A second aspect of the present disclosure provides a modified graphene prepared by the method according to the first aspect of the present disclosure.

By means of the aforementioned technical solutions, the present disclosure modifies graphene oxide, which not only improves the thermal conductivity and surface properties of graphene oxide, but also reduces its electrical conductivity, and the resulting modified graphene can be used in the preparation of heat dissipation materials or insulating materials, which have a wide range of uses.

A third aspect of the present disclosure provides a thermal conductive composition comprising a silicone oil, a first filler, a second filler and an optional auxiliary agent, wherein based on 100 parts by weight of the silicone oil, the content of the first filler is 10 to 60 parts by weight, the content of the second filler is 50 to 150 parts by weight, and the content of the auxiliary agent is 0 to 20 parts by weight; the first filler includes a metal thermal conductive material and a phase change material, and the weight ratio between the metal thermal conductive material and the phase change material is 1:(0.2-2.5); the second filler consists of a carbon nanotubes and the modified graphene of the second aspect of the present disclosure, the weight ratio between the carbon nanotubes and the modified graphene is 1:(1-20).

Optionally, based on 100 parts by weight of the silicone oil, the content of the first filler is 20-40 parts by weight, the content of the second filler is 80-120 parts by weight, and the content of the auxiliary agent is 0-10 parts by weight.

Optionally, R calculated by the following formula is 6.5-35.5:

$$R=0.656w(\text{second filler})-1.581w(\text{first filler})+0.11w(\text{auxiliary agent}),$$

wherein w(first filler) represents parts by weight of the first filler relative to 100 parts by weight of the silicone oil, w(second filler) represents parts by weight of the second filler relative to 100 parts by weight of the silicone oil, and w(auxiliary agent) represents parts by weight of the auxiliary agent relative to 100 weight parts of the silicone oil.

Optionally, the metal thermal conductive material is at least one selected from the group consisting of metals, metal oxides, metal carbides, and metal nitrides, wherein the metal in the metal thermal conductive material is at least one selected from the group consisting of platinum, silver, copper, aluminum, tin, zinc, calcium, lanthanum, yttrium, and cerium.

The phase transition temperature of the phase change material is 20-80° C., wherein the phase change material is at least one selected from the group consisting of paraffin, polyethylene glycol, stearic acid, and urea, and wherein the paraffin is at least one selected from the group consisting of microcrystalline wax, liquid paraffin, polyethylene wax, and semi-refined paraffin wax.

Preferably, the first filler is a capsule formed by wrapping the phase change material with the metal thermal conductive material and the particle size of the capsule is 1-100 nm.

Optionally, the phase change material is polyethylene glycol, the metal thermal conductive material is zinc oxide, and the weight ratio of the zinc oxide to the polyethylene glycol is 1:(1-1.5).

Alternatively, the phase change material is polyethylene wax, the metal thermal conductive material is copper, and the weight ratio of the copper to the polyethylene wax is 1:(1.5-2).

Optionally, the carbon nanotube have a purity of not less than 95% by weight, an ash content of not more than 0.2% by weight, and a specific surface area of 40-300 m$^2$/g.

The silicone oil is at least one selected from the group consisting of dimethyl silicone oil, vinyl silicone oil, hydrogen-containing silicone oil, benzyl silicone oil, hydroxy silicone oil, methyl long-chain alkyl silicone oil, and quaternary ammonium salt hydrocarbyl modified silicone oil; preferably, the viscosity of the silicone oil at 25° C. is 50,000 to 500,000 cSt.

The auxiliary agent is at least one selected from the group consisting of antioxidants, resists, anti-wear agents, and lubricity enhancers.

The thermal conductive composition of the present disclosure uses a metal thermally conductive material and a phase change material as a first filler. Compared with the traditional metal thermal conductive material, the thermal conductive composition of the present disclosure can effectively improve the heat absorption rate of the heat source and have the effects of rapid heat absorption and heat transfer. The thermal conductive composition of the present disclosure also uses, as a second filler, carbon nanotubes and modified graphene which significantly increase the thermal conductivity, reduce the electrical conductivity, are more compatible with silicone oil, and further improve the quality and performance of the product.

A fourth aspect of the present disclosure provides a graphene heat dissipation composition, comprising a fluoropolymer, the modified graphene of the second aspect of the present disclosure, a carbon nanotube, a metal thermal conductive material, and an optional additive, wherein based on 100 parts by weight of the fluoropolymer, the content of the modified graphene is 5-25 parts by weight, the content of the carbon nanotube is 4-15 parts by weight, the content of the metal thermal conductive material is 0.1 to 8 parts by weight, and the content of the additive is 0 to 90 parts by weight.

Optionally, R calculated by the following formula is 32.5-65.5:

$$R=2.376w(\text{modified graphene})+0.828w(\text{carbon nanotube})-1.755w(\text{metal thermal conductive material})+0.064(\text{additive}),$$

wherein w(modified graphene) represents parts by weight of the modified graphene relative to 100 parts by weight of the fluoropolymer, w(carbon nanotube) represents parts by weight of the carbon nanotubes relative to 100 weight parts of the fluoropolymer.

w(metal thermal conductive material) represents parts by weight of the metal thermal conductive particulate material relative to 100 parts by weight of the fluoropolymer, and w(additive) represents parts by weight of the additive relative to 100 weight parts of the fluoropolymer.

Optionally, the metal thermal conductive material has a particle size of 0.1-100 μm, and the metal thermal conductive material is at least one selected from the group consisting of metals, metal oxides, metal carbides, and metal nitrides, wherein the metal in the metal thermal conductive material is at least one selected from the group consisting of platinum, silver, copper, aluminum, tin, zinc, calcium, lanthanum, yttrium, and cerium.

The carbon nanotube has a purity of not less than 95% by weight, an ash content of not more than 0.2% by weight, and a specific surface area of 40-300 m$^2$/g.

The fluoropolymer has a weight-average molecular weight of 1,000-100,000, and the fluoropolymer is at least one selected from the group consisting of polytetrafluoroethylene, polychlorotrifluoroethylene, polyvinylidene fluoride, ethylene-tetrafluoroethylene copolymer, ethylene-chlorotrifluoroethylene copolymer and polyvinyl fluoride; preferably, the fluoropolymer is polytetrafluoroethylene and polyvinylidene fluoride, and the weight ratio between the polytetrafluoroethylene and the polyvinylidene fluoride is 1:(2-6).

The additive is at least one selected from the group consisting of diluents, curing agents, stabilizers, leveling agents, coloring agents, and thixotropic agents.

A fifth aspect of the present disclosure provides a graphene composite composition, comprising a main phase change material, the modified graphene of the second aspect of the present disclosure, a carbon nanotube, a metal thermal conductive particulate matter, and a composite auxiliary agent, wherein based on 100 parts by weight of the main phase change material, the content of the modified graphene is 5-40 parts by weight, the content of the carbon nanotube is 1-20 parts by weight, the content of the metal thermal conductive particulate matter is 5 to 40 parts by weight, and the content of the composite auxiliary agent is 2 to 30 parts by weight; and wherein the composite auxiliary agent is an organic matter-silica composite.

Optionally, R calculated by the following formula is 22.5-40.5:

$$R=0.78w(\text{modified graphene})+0.66w(\text{carbon nanotubes})-0.24w(\text{metal thermal conductive particulate matter})+0.15w(\text{composite auxiliary agent}),$$

wherein w(modified graphene) represents parts by weight of the modified graphene relative to 100 parts by weight of the main phase change material, w(carbon nanotube) represents parts by weight of the carbon nanotube relative to 100 weight parts of the main phase change material.

w(metal thermal conductive particulate matter) represents parts by weight of the metal thermal conductive particulate matter relative to 100 parts by weight of the main phase change material, and w(composite auxiliary agent) represents parts by weight of the composite auxiliary agent relative to 100 weight parts of the main phase change material.

Optionally, the metal thermal conductive particulate matter has a particle size of 0.1-100 μm, and the metal thermal conductive particulate matter is at least one selected from the group consisting of metals, metal oxides, metal carbides, and metal nitrides, wherein the metal in the metal thermal conductive material is at least one selected from the group consisting of platinum, silver, copper, aluminum, tin, zinc, calcium, lanthanum, yttrium, and cerium.

The carbon nanotube has a purity of not less than 95% by weight, an ash content of not more than 0.2% by weight, and a specific surface area of 40-300 m$^2$/g.

The phase transition temperature of the main phase change material is 20-80° C., wherein the main phase change material is at least one selected from the group consisting of hydrated inorganic salts, normal alkanes, halogenated hydrocarbons, fatty acids, fatty acid esters, paraffin, polyethylene glycol, stearic acid and urea, and wherein the paraffin is at least one selected from the group consisting of microcrystalline wax, liquid paraffin, polyethylene wax, and semi-refined paraffin wax; preferably, the main phase change material is stearin acid and polyethylene wax, and the weight ratio between the stearin acid and the polyethylene wax is 1:(0.1-10).

The composite auxiliary agent consists of polyvinyl alcohol-silica composite and/or stearic acid-silica composite.

Optionally, the composition further comprises an additive, wherein based on 100 parts by weight of the main phase change material, the content of the additive is 1-10 parts by weight, and wherein the additive is at least one selected from the group consisting of a stabilizer, a leveling agent, and a thixotropic agent.

The present disclosure uses the special modified graphene in combination with carbon nanotubes, metal thermal conductive material and etc. in specific ratios, achieving the following advantageous effects over the existing products:

(1) Higher thermal conductivity, and higher efficiency of heat absorption and dissipation;

(2) Lower conductivity and better insulation performance;

(3) Better weather resistance, abrasion resistance and chemical stability; and (4) It can be used as a phase change energy storage material or heat dissipation material in various scenarios requiring heat dissipation, with a long service life and excellent practical and economic value.

Other features and advantages of the present disclosure will be described in detail in the following specific embodiments.

DETAILED DESCRIPTION

Specific embodiments of the present disclosure will be described in detail below. It should be understood that the embodiments described herein are for the purpose of illustrating and explaining the present disclosure only and are not intended to limit the present disclosure.

The first aspect of the present disclosure provides a modification method for graphene, comprising: mixing graphene oxide, a silicate ester, an inorganic alkali solution, a water-soluble polymer compound and a surfactant, followed by reacting at 10 to 50° C. for 0.1 to 10 hours, and collecting and drying solid product of the reaction to obtain the modified graphene, wherein the surfactant is at least one selected from the group consisting of cationic surfactants, anionic surfactants, nonionic surfactants, and zwitterionic surfactants.

According to the present disclosure, the graphene oxide is well known to those skill in the art and can be prepared using methods in the prior art or can be commercially available. The average particle size of said graphene oxide may be 0.1-20 μm.

According to the present disclosure, the anionic surfactant may be at least one selected from the group consisting of sodium dodecylbenzene sulfonate, sodium lignosulfonate, PAAS, P90, 610S, sodium hexametaphosphate, and sodium lauryl sulfate. The nonionic surfactant may be at least one selected from the group consisting of PVPK17, tributyl phosphate, polyvinyl alcohol, polyethylene glycol, Tween 20, and Span 80. All of the aforementioned surfactants are commercially available.

According to one embodiment of the present disclosure, the surfactant may be an anionic surfactant, wherein the weight ratio among the graphene oxide, silicate ester, inorganic alkali solution, water-soluble polymer compound and anionic surfactant may be 1:(0.5-4):(0.01-2):(0.1-0.8):(0.02-0.5), preferably 1:(1.8-2.8):(0.6-1):(0.3-0.6):(0.1-0.25), in order to achieve the desired effect.

Further, the anionic surfactant may consist of PAAS and P90, and the weight ratio between PAAS and P90 is 1:(0.5-1.2). The above two anionic surfactants may be in the form of an aqueous solution with a certain concentration, and the desired effect can be achieved when the concentration of the aqueous solution is low, for example, the concentration of the PAAS may be 0.1-6 g/L and the concentration of the P90 may be 0.1-6 g/L. Using anionic surfactants in such combination and ratio for the modification reaction is beneficial to optimize the thermal conductivity and surface properties of graphene.

Alternatively, the anionic surfactant may consist of sodium dodecylbenzene sulfonate and sodium lignosulfonate, and the weight ratio between sodium dodecylbenzene sulfonate and sodium lignosulfonate is 1:(1-2). The above two anionic surfactants may be in the form of an aqueous solution with a certain concentration, and the desired effect can be achieved when the concentration of the aqueous solution is low, for example, the concentration of the sodium dodecylbenzene sulfonate may be 1-20 g/L and the concentration of the sodium lignosulfonate may be 1-20 g/L. Using anionic surfactants in such combination and ratio for the modification reaction can significantly reduce the thermal conductivity of graphene.

Alternatively, the anionic surfactant may consist of 610S and P90, and the weight ratio between 610S and P90 is 1:(0.05-0.5). The above two anionic surfactants may be in the form of an aqueous solution with a certain concentration, and the desired effect can be achieved when the concentration of the aqueous solution is low, for example, the concentration of the 610S may be 2-20 g/L and the concentration of the P90 may be 0.05-4 g/L. As such, the modified graphene has a higher thermal conductivity and a lower conductivity.

According to another embodiment of the present disclosure, the surfactant may be an anionic surfactant, wherein the weight ratio among the graphene oxide, silicate ester, inorganic alkali solution, water-soluble polymer compound and anionic surfactant may be 1:(0.5-4):(0.01-2):(0.05-0.5):(0.1-0.8), preferably 1:(1.8-2.8):(0.6-1):(0.08-0.25):(0.3-0.6), in order to achieve the desired effect.

Further, the nonionic surfactant may consist of PVPK17 and tributyl phosphate, and the weight ratio between PVPK17 and tributyl phosphate is 1:(1-2). The above two anionic surfactants may be in the form of an aqueous solution with a certain concentration, and the desired effect can be achieved when the concentration of the aqueous solution is low, for example, the concentration of the PVPK17 may be 1-20 g/L and the concentration of the tributyl phosphate may be 1-15 g/L. Using nonionic surfactants in such combination and ratio for the modification reaction is beneficial to optimize the thermal conductivity and surface properties of graphene.

Alternatively, the nonionic surfactant may consist of polyvinyl alcohol and polyethylene glycol, and the weight ratio between polyvinyl alcohol and polyethylene glycol is 1:(0.1-0.6). Further, the weight-average molecular weight of the polyvinyl alcohol may be 1,000-5,000, and the weight-average molecular weight of the polyethylene glycol may be 200-1,000. The above two nonionic surfactants may be in the form of an aqueous solution with a certain concentration, and the desired effect can be achieved when the concentration of the aqueous solution is low, for example, the concentration of the polyvinyl alcohol may be 1-10 g/L and the concentration of the polyethylene glycol may be 1-10 g/L. Using nonionic surfactants in such combination and ratio for the modification reaction can significantly reduce the thermal conductivity of graphene.

According to a third embodiment of the present disclosure, the surfactant may consist of an anionic surfactant and a nonionic surfactant. In this case, the weight ratio among the graphene oxide, silicate, inorganic alkali solution, water-soluble polymer compound and anionic surfactant may be 1:(0.5-4):(0.01-2):(0.1-0.8):(0.01-0.8), preferably 1:(1.8-2.8):(0.6-1):(0.2-0.6):(0.1-0.5), in order to achieve the desired effect. The weight ratio between the anionic surfactant and the nonionic surfactant may be 1:(0.001-2).

Further, when the surfactant consists of an anionic surfactant and a nonionic surfactant, the surfactant may consists of PAAS and PVPK17, and the weight ratio between PAAS and PVPK17 is 1:(0.01-0.2). The above two surfactants may be in the form of an aqueous solution with a certain concentration, and the desired effect can be achieved when the concentration of the aqueous solution is low, for example, the concentration of the PAAS may be 0.1-6 g/L and the concentration of the PVPK17 may be 1-20 g/L. Using surfactants in such combination and ratio for the modification reaction is beneficial to optimize the thermal conductivity and surface properties of graphene.

Alternatively, the surfactant may consist of P90 and polyethylene glycol, and the weight ratio between P90 and polyethylene glycol is 1:(0.5-1); and further, the weight-average molecular weight of the polyethylene glycol may be 200-400. The above two surfactants may be in the form of an aqueous solution with a certain concentration, and the desired effect can be achieved when the concentration of the aqueous solution is low, for example, the concentration of the P90 may be 0.05-4 g/L and the concentration of the polyethylene glycol may be 1-10 g/L. Using nonionic surfactants in such combination and ratio for the modification reaction can significantly reduce the thermal conductivity of graphene.

Alternatively, the surfactant may consist of P90 and PVPK17, and the weight ratio between P90 and PVPK17 is 1:(0.15-0.35). The above two surfactants may be in the form of an aqueous solution with a certain concentration, and the desired effect can be achieved when the concentration of the aqueous solution is low, for example, the concentration of the P90 may be 0.05-4 g/L and the concentration of the PVPK17 may be 1-20 g/L. As such, the modified graphene has a high thermal conductivity and a low conductivity.

According to a fourth embodiment of the present disclosure, the surfactant may consist of a cationic surfactant and/or a zwitterionic surfactant, and preferably at least one selected from the group consisting of cetyltrimethylammonium bromide, tetradecyltrimethylammonium bromide, dodecylaminopropionic acid, methyl acrylate, and alkyl dimethyl hydroxypropyl phosphate betaine. In this case, the weight ratio among the graphene oxide, silicate, inorganic alkali solution, water-soluble polymer compound and anionic surfactant may be 1:(0.5-6):(0.1-10):(0.02-0.5):(0.02-1), preferably 1:(1-1.5):(0.5-5):(0.1-0.3):(0.05-0.5). In a preferred embodiment, the surfactant consists of cetyltrimethylammonium bromide and methyl acrylate, and the weight ratio between cetyltrimethylammonium bromide and methyl acrylate is 1:(0.1-0.8). Using surfactants in such combination and ratio for the modification reaction is beneficial to optimize the thermal conductivity of modified graphene and reducing its electrical conductivity.

According to the present disclosure, the silicate ester may be at least one selected from the group consisting of tetramethyl orthosilicate, tetraethyl orthosilicate, isopropyl orthosilicate, and trimethylsiloxysilicate. In a preferred embodiment, the silicate ester consists of tetramethyl orthosilicate and trimethylsiloxysilicate, and the weight ratio between tetramethyl orthosilicate and trimethylsiloxysilicate is 1:(0.1-1). The use of silicate in such combination and ratio can form an insulating film layer covering the surface of the graphene oxide during the modification reaction, thereby reducing the conductivity of the graphene.

According to the present disclosure, the inorganic alkali solution may be a common aqueous solution of various inorganic alkalis. And the inorganic alkali solution may be, for example, at least one selected from the group consisting of sodium hydroxide solution, potassium hydroxide solution, calcium hydroxide solution, sodium carbonate solution, sodium bicarbonate solution, and potassium carbonate solution. The concentration of the inorganic alkali solution may be 30-100 g/L.

According to the present disclosure, the water-soluble polymer compound may consists of a polymer resin and/or a condensation resin. And preferably, the water-soluble polymer compound is at least one selected from the group consisting of polyacrylamide, polyacrylic acid, polymaleic anhydride, epoxy resin, alkyd resin, and amino resin. To further improve the surface properties and thermal conductivity of the modified graphene, the water-soluble polymer compound is preferably polyacrylic acid having a weight average molecular weight of 5,000 to 20,000.

To further improve the surface properties of the modified graphene, in an embodiment of the present disclosure, the method may further comprise carrying out the reaction in the presence of a coupling agent, wherein the weight ratio of the graphene oxide to the coupling agent may be 1:(0.5-4). The coupling agent may be a silane coupling agent, and further may be at least one selected from the group consisting of vinyl trimethoxy silane, vinyl triethoxy silane, vinyl tris (β-methoxyethoxy) silane, γ-aminopropyltrimethoxysilane propyltrimethoxysilane, γ-aminopropylmethyldiethoxysilane, and γ-aminopropyltriethoxysilane, most preferably γ-aminopropyltriethoxysilane. The modified graphene obtained in this embodiment has better compatibility with oily materials, and is particularly suitable for compounding with oily materials to prepare thermal conductive materials such as thermal conductive silicone grease.

According to the present disclosure, the temperature of the reaction is preferably 20-40° C. and the time of the reaction is preferably 2-4 hours. In order to obtain the desired effect, the reaction may be carried out under stirring conditions. The drying conditions may be as follows: the temperature is 80-150° C., preferably 90-120° C., and the time is 1-24 hours, preferably 2-4 hours.

A second aspect of the present disclosure provides a modified graphene prepared by the method of the first aspect of the present disclosure. The modified graphene prepared by the method improved in the first aspect of the present disclosure has a thermal conductivity and a lower electrical conductivity. For example, the thermal conductivity of the modified graphene may be 50.5-145 W/(m·K) such as 50.5-98.5 W/(m·K) or 100-145 W/(m·K), and the electrical conductivity may be 40-240 S/m such as 40-150 S/m or 55-240 S/m, and the average particle size may be 0.1-20 μm. The thermal conductivity and electrical conductivity may be tested by conventional methods. For example, the thermal conductivity may be tested according to ASTM D5470, and the electrical conductivity may be tested according to Q/JSGL 006-2014.

The modified graphene of the present disclosure can be used to prepare heat dissipation materials or insulating materials, which have a wide range of uses.

A third aspect of the present disclosure provides a thermal conductive composition comprising a silicone oil, a first filler, a second filler and an optional auxiliary agent, wherein based on 100 parts by weight of the silicone oil, the content of the first filler is 10 to 60 parts by weight, the content of the second filler is 50 to 150 parts by weight, and the content of the auxiliary agent is 0 to 20 parts by weight; the first filler includes a metal thermal conductive material and a phase change material, and the weight ratio of the metal thermal conductive material to the phase change material is 1:(0.2-2.5); the second filler consists of a carbon nanotube and the modified graphene of the second aspect of the present disclosure, and the weight ratio of the carbon nanotube to the modified graphene is 1:(1-20).

The inventors have found that the modified graphene obtained by modifying graphene oxide using the method of the present disclosure has improved thermal conductivity, better insulating properties (i.e., reduced electrical conductivity) and better compatibility with silicone oil, giving the thermal conductive composition of the present disclosure excellent quality and performance.

According to the third aspect of the present disclosure, in order to further improve the thermal conductivity of the composition, preferably, based on 100 parts by weight of the silicone oil, the content of the first filler is 20-40 parts by weight, the content of the second filler is 80-120 parts by weight, and the content of the auxiliary agent is 0-10 parts by weight.

According to the third aspect of the present disclosure, in order to further improve the thermal conductivity of the composition, R calculated by the following formula can be 6.5-35.5:

$$R=0.656w(\text{second filler})-1.581w(\text{first filler})+0.11w(\text{auxiliary agent}),$$

wherein w(first filler) represents parts by weight of the first filler relative to 100 parts by weight of the silicone oil, w(second filler) represents parts by weight of the second filler relative to 100 parts by weight of the silicone oil, and w(auxiliary agent) represents the weight part of the auxiliary agent relative to 100 weight parts of the silicone oil.

According to the third aspect of the present disclosure, the weight ratio between the metal thermal conductive material and the phase change material is preferably 1:(1-2), for example 1:(1.2-1.5), 1:(1.8-2). The first filler composed of the metal thermal conductive material and the phase change material in the above-mentioned ratio range can maximize the heat transfer effect of the thermal conductive composition.

According to the third aspect of the present disclosure, the metal thermal conductive material is a common metal material with thermal conductivity, for example, it may be at least one selected from the group consisting of metals, metal oxides, metal carbides, and metal nitrides, wherein the metal in the metal thermal conductive material may be at least one selected from the group consisting of platinum, silver, copper, aluminum, tin, zinc, calcium, lanthanum, yttrium, and cerium.

According to the third aspect of the present disclosure, in order to achieve the desired effect, the phase transition temperature of the phase change material may be 20 to 80° C. The phase change material may be a common material with a phase transition temperature within the above range, for example, it may be at least one selected from the group consisting of paraffin, polyethylene glycol, stearic acid, and urea. The paraffin may be at least one selected from the group consisting of microcrystalline wax, liquid paraffin, polyethylene wax, and semi-refined paraffin wax.

According to a preferred embodiment of the third aspect of the present disclosure, the phase change material is polyethylene glycol. In this embodiment, the metal thermal conductive material may consist of zinc oxide. In this case, the weight ratio between the zinc oxide and polyethylene glycol may be 1:(1 to 1.5). Such preferred embodiment is beneficial to obtain a higher thermal conductivity and a lower thermal resistance.

According to another preferred embodiment of the third aspect of the present disclosure, the phase change material is polyethylene wax. In this embodiment, the metal thermal conductive material may be copper. In this case, the weight ratio between the copper and polyethylene wax may be 1:(1.5 to 2). Such preferred embodiment is beneficial to obtain better heat absorption rate and heat transfer effect.

According to the third aspect of the present disclosure, the first filler is preferably a capsule formed by wrapping the phase change material with the metal thermal conductive material and the particle size of the capsule is 1-100 nm. In this way, the first filler in the form of a capsule has a larger specific surface area, which is beneficial to further exert the heat absorption performance of phase change material and improve the heat absorption rate of heat source. The metal thermal conductive material is nanometer sized.

According to the third aspect of the present disclosure, in order to achieve the desired effect, the purity of the carbon nanotube may be not less than 95% by weight, the ash content may be not more than 0.2% by weight, and the specific surface area may be 40-300 m$^2$/g.

According to the third aspect of the present disclosure, the silicone oil may be a common silicone oil used for preparing the thermal conductive silicone grease, for example, it may be at least one selected from the group consisting of dimethyl silicone oil, vinyl silicone oil, hydrogen-containing silicone oil, benzyl silicone oil, hydroxy silicone oil, methyl long-chain alkyl silicone oil, and quaternary ammonium salt hydrocarbyl modified silicone oil. The viscosity of the silicone oil at 25° C. is 50,000 to 500,000 cSt.

According to the third aspect of the present disclosure, the auxiliary agent may be a common auxiliary agent used for preparing the thermal conductive silicone grease, for example, it may be at least one selected from the group consisting of antioxidants, resists, anti-wear agents, and lubricity enhancers. The antioxidant may be, for example, an amine antioxidant, a phenolic antioxidant, a phosphite antioxidant, and the like. The resist may be, for example, naphthenate or the like. The anti-wear agent may be, for example, a sulfur-containing compound, a phosphorus-containing compound, and the like. The lubricity enhancer may be, for example, a mineral oil or the like. The present disclosure has no special restrictions on the type of the auxiliary agent and the selection of specific substances.

The thermal conductive composition provided by the present disclosure has high thermal conductivity, low thermal resistance, good heat dissipation efficiency, low electrical conductivity, good insulation performance, long service life, excellent utility value and economic value.

A fourth aspect of the present disclosure provides a graphene heat dissipation composition, comprising a fluoropolymer, the modified graphene of the second aspect of the present disclosure, a carbon nanotube, a metal thermal conductive material, and an optional additive, wherein based on 100 parts by weight of the fluoropolymer, the content of the modified graphene is 5-25 parts by weight, the content of the carbon nanotube is 4-15 parts by weight, the content of the metal thermal conductive material is 0.1 to 8 parts by weight, and the content of the additive is 0 to 90 parts by weight.

According to the fourth aspect of the present disclosure, in order to further improve the effect of heat absorption and heat dissipation of the composition, R calculated by the following formula can be 32.5-65.5: R=2.376w(modified graphene)+0.828w(carbon nanotube)−1.755w(metal thermal conductive material)+0.064(additive), wherein w(modified graphene) represents parts by weight of the modified graphene relative to 100 parts by weight of the fluoropolymer, w(carbon nanotube) represents parts by weight of the carbon nanotubes relative to 100 weight parts of the fluoropolymer, w(metal thermal conductive material) represents parts by weight of the metal thermal conductive material relative to 100 parts by weight of the fluoropolymer, and w(additive) represents parts by weight of the additive relative to 100 weight parts of the fluoropolymer.

According to the fourth aspect of the present disclosure, the metal thermal conductive material is a common metal material with thermal conductivity, for example, it may be at least one selected from the group consisting of metals, metal oxides, metal carbides, and metal nitrides, wherein the metal in the metal thermal conductive material may be at least one selected from the group consisting of platinum, silver, copper, aluminum, tin, zinc, calcium, lanthanum, yttrium, and cerium. Further, the metal thermal conductive material may be granular, and its particle size may be 0.1-100 μm.

According to the third aspect of the present disclosure, in order to achieve the desired effect, the purity of the carbon nanotube may be not less than 95% by weight, the ash content may be not more than 0.2% by weight, and the specific surface area may be 40-300 m²/g.

According to the fourth aspect of the present disclosure, the fluoropolymer may be at least one selected from the group consisting of polytetrafluoroethylene, polychlorotrifluoroethylene, polyvinylidene fluoride, ethylene-tetrafluoroethylene copolymer, ethylene-chlorotrifluoroethylene copolymer and polyvinyl fluoride. And the fluoropolymer may have a weight-average molecular weight of 1,000-100,000. In a preferred embodiment of the present disclosure, in order to further improve the insulativity, weather resistance, abrasion resistance and chemical stability of the composition, the fluoropolymer consists of polytetrafluoroethylene and polyvinylidene fluoride, and the weight ratio between the polytetrafluoroethylene and the polyvinylidene fluoride is 1:(2-6).

According to the fourth aspect of the present disclosure, the additive may be of any type that can improve the processability of the composition and further enhance the product quality, such as a diluent, a curing agent, and the like. In addition, the additive may further comprise a stabilizer for increasing the stability of the composition, a leveling agent for improving the levelling property and uniformity of the composition, a coloring agent for imparting color to the composition, and a thixotropic agent for anti-settling and thickening, and the like. The present disclosure has no special restrictions on the type of the additive and the selection of specific substances.

The graphene heat dissipation composition provided by the present disclosure has high thermal conductivity, good heat dissipation efficiency, low electrical conductivity, good insulation performance, long service life, and excellent utility value and economic value.

A fifth aspect of the present disclosure provides a graphene composite composition, comprising a main phase change material, the modified graphene of the second aspect of the present disclosure, a carbon nanotube, metal thermal conductive particulate matter, and a composite auxiliary agent, wherein based on 100 parts by weight of the main phase change material, the content of the modified graphene is 5-40 parts by weight, the content of the carbon nanotube is 1-20 parts by weight, the content of the metal thermal conductive particulate matter is 5 to 40 parts by weight, and the content of the composite auxiliary agent is 2 to 30 parts by weight; and wherein the composite auxiliary agent is an organic matter-silica composite.

According to the fifth aspect of the present disclosure, in order to further improve the heat absorption and heat dissipation effect of the composition, R calculated by the following formula can be 22.5-40.5:

$R=0.78w$(modified graphene)$+0.66w$(carbon nanotube)$-0.24w$(metal thermal conductive particulate matter)$+0.15w$(composite auxiliary agent), wherein w (modified graphene) represents parts by weight of the modified graphene relative to 100 parts by weight of the main phase change material, w (carbon nanotube) represents the weight part of the carbon nanotube relative to 100 weight parts of the main phase change material, w (metal thermal conductive particulate matter) represents parts by weight of the metal thermal conductive particulate matter relative to 100 parts by weight of the main phase change material, and w (composite auxiliary agent) represents the weight part of the composite auxiliary agent relative to 100 weight parts of the main phase change material.

According to the fifth aspect of the present disclosure, the metal thermal conductive particulate matter is a common particulate metal material with thermal conductivity, and its particle size may be 0.1-100 μm. For example, it may be at least one selected from the group consisting of metals, metal oxides, metal carbides, and metal nitrides, wherein the metal in the metal thermal conductive particulate matter may be at least one selected from the group consisting of platinum, silver, copper, aluminum, tin, zinc, calcium, lanthanum, yttrium, and cerium.

According to the fifth aspect of the present disclosure, in order to achieve the desired effect, the purity of the carbon nanotube may be not less than 95% by weight, the ash content may be not more than 0.2% by weight, and the specific surface area may be 40-300 m²/g.

According to the fifth aspect of the present disclosure, in order to achieve the desired effect, the phase transition temperature of the main phase change material may be 20 to 80° C. The phase change material may be a common material with a phase transition temperature within the above range, for example, it may be at least one selected from the group consisting of hydrous inorganic salts, normal alkanes, halogenated hydrocarbons, fatty acids, fatty acid esters, paraffin, polyethylene glycol, stearic acid, and urea. The paraffin may be at least one selected from the group consisting of microcrystalline wax, liquid paraffin, polyethylene wax, and semi-refined paraffin wax.

In a preferred embodiment of the fifth aspect of the present disclosure, the main phase change material consists of stearic acid and polyethylene wax, and the weight ratio between the stearin acid and the polyethylene wax may be 1:(0.1-10). This embodiment is beneficial to further improve the thermal conductivity of the composition.

According to the fifth aspect of the present disclosure, the presence of the composite auxiliary agent can achieve the effects of anti-settling and thickening, to prevent aggregation and sedimentation among the components of the composition, and can further improve the heat absorption and heat dissipation effects of the composition. The organic matter-silica composite refers to a functional material that compounds the organic matter and silicon dioxide by chemical or physical methods to simultaneously exert the advantages of both. Preferably, the composite auxiliary agent is polyvinyl alcohol-silica composite and/or stearic acid-silica composite. The above-mentioned materials can be prepared by methods in the prior art (such as Wang W, Yang X, Fang Y, et al. Preparation and performance of form-stable polyethylene glycol/silicon dioxide composites as solid-liquid phase change materials. Applied Energy, 2009, 86(2):170-174), or can be commercially available.

According to the fifth aspect of the present disclosure, in order to further optimize the performance of the graphene composite composition, the composition may further comprise an additive, wherein based on 100 parts by weight of the main phase change material, the content of the additive may be 1-10 parts by weight. The additive may be, for example, a stabilizer for increasing the stability of the composition, a leveling agent for improving the levelling property and uniformity of the composition, and a thixotropic agent for anti-settling and thickening, and the like. The present disclosure has no special restrictions on the type of the additive and the selection of specific substances.

The graphene composite composition provided by the present disclosure has high thermal conductivity, good heat dissipation efficiency, low electrical conductivity, good insulation performance, long service life, and excellent utility value and economic value.

The present disclosure is further described by the following examples, but the present disclosure is not limited thereto in any way.

In the examples, the graphene oxide is prepared according to the Hummers method (Hummers W S, Offeman R E. J. Am. Chem. Soc., 1958, 80:1339-1339), and its average particle size is 0.1-20 μm. Some sources of raw materials are as follows:

PAAS, Analytical Reagent (AR), produced by Tego technology; 610S, AR, produced by Tego technology; P90, AR, produced by Shandong Qingdao Haienke Chemical Co., Ltd.; sodium dodecylbenzene sulfonate, AR, produced by Tianjin Bodi Chemical Co., Ltd; sodium lignosulfonate, AR, produced by Changzhou Zhongnan Chemical Co., Ltd.; sodium hexametaphosphate, AR, produced by Tianjin Chemical Reagent Sixth Factory; sodium lauryl sulfate, AR, produced by Tianjin Komiou Chemical Reagent Development Center; PVPK17, analytical grade, produced by Tianjin Komiou Chemical Reagent Development Center; tributyl phosphate, AR, produced by Baihe Branch of Shanghai Reagent Factory, China; polyvinyl alcohol, AR, produced by Tianjin Komiou Chemical Reagent Development Center; polyethylene glycol, AR, produced by Shandong Laiyang Fine Chemical Plant; Tween20, AR, produced by Tianjin Komiou Chemical Reagent Development Center; and silane coupling agent, AR, produced by Nanjing Shuguang Co., Ltd.

The preparation of the stearic acid-silica composite comprises adding 5 g stearic acid, 2 g emulsifier and 10 g HCl to 100 ml distilled water, followed by reacting at 70° C. for 2 hours under stirring, then the additing 10 ml tetraethyl orthosilicate, and continuous reacting at 70° C. for 2 hours under stirring, separating to obtain the precipitate, washing and drying. Other raw materials are all commercially available products.

Other raw materials are all commercially available products.

Examples 1 to 52 illustrate the modification method for graphene and modified graphene of the present disclosure.

Examples 1-14 are cases where the surfactant is an anionic surfactant.

Example 1

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and P90 (concentration: 1.5 g/L) were mixed according to the weight ratio of 1:1.5:0.5:0.8:0.4:0.1:0.08 and stirred at 40° C. for 2 hours. The solid product was collected and dried at 120° C. for 2 hours to obtain a modified graphene with an average particle size of 0.1-20 μm.

Example 2

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and P90 (concentration: 1.5 g/L) were mixed according to the weight ratio of 1:1.4:1.4:0.6:0.6:0.1:0.12 and stirred at 40° C. for 2 hours. The solid product was collected and dried at 120° C. for 2 hours to obtain a modified graphene with an average particle size of 0.1-20 μm.

Example 3

Graphene oxide, tetramethyl orthosilicate, trimethylsiloxysilicate, sodium carbonate solution (concentration: 60 g/L), polyacrylic acid (weight-average molecular weight: 5,000), sodium dodecylbenzene sulfonate (concentration: 12 g/L) and sodium lignosulfonate (concentration: 16 g/L) were mixed according to the weight ratio of 1:1.5:0.5:0.8:0.4:0.1:0.15 and stirred at 30° C. for 4 hours. The solid product was collected and dried at 120° C. for 2 hours to obtain a modified graphene with an average particle size of 0.1-20 μm.

Example 4

Graphene oxide, tetramethyl orthosilicate, trimethylsiloxysilicate, sodium carbonate solution (concentration: 60 g/L), polyacrylic acid (weight-average molecular weight: 5,000), sodium dodecylbenzene sulfonate (concentration: 12 g/L) and sodium lignosulfonate (concentration: 16 g/L) were mixed according to the weight ratio of 1:1:0.8:1:0.3:0.05:0.1 and stirred at 30° C. for 4 hours. The solid product was collected and dried at 120° C. for 2 hours to obtain a modified graphene with an average particle size of 0.1-20 μm.

Example 5

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L) and P90 (concentration: 1.5 g/L) were mixed according to the weight ratio of 1:1.5:0.5:0.8:0.4:0.1:0.02 and stirred at 40° C. for 2 hours. The solid product was collected and dried at 120° C. for 2 hours to obtain a modified graphene with an average particle size of 0.1-20 μm.

Example 6

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L) and P90 (concentration: 1.5 g/L) were mixed according to the weight ratio of 1:2:0.5:0.7:0.5:0.2:0.02 and stirred at 40° C. for 2 hours. The solid product was collected and dried at 120° C. for 2 hours to obtain a modified graphene with an average particle size of 0.1-20 μm.

Example 7

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L) and sodium hexametaphosphate (concentration: 15 g/L) were mixed according to the weight ratio of 1:1.5:0.5:0.8:0.4:0.1:0.18 and stirred at 40° C. for 2 hours. The solid product was collected and dried at 120° C. for 2 hours to obtain a modified graphene with an average particle size of 0.1-20 μm.

Example 8

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and sodium lignosulfonate (concentration: 16 g/L) were mixed according to the weight ratio of 1:1.5:0.5:0.8:0.4:0.1:0.15 and stirred at 40° C. for 2 hours. The solid product was collected and dried at 120° C. for 2 hours to obtain a modified graphene with an average particle size of 0.1-20 μm.

Example 9

Graphene oxide, tetramethyl orthosilicate, sodium hydroxide solution (concentration: 30 g/L), polyacrylic acid (weight-average molecular weight: 5,000), 610S (concentration: 6 g/L) and P90 (concentration: 1.5 g/L) were mixed according to the weight ratio of 1:2:0.8:0.4:0.1:0.02 and stirred at 40° C. for 2 hours. The solid product was collected and dried at 120° C. for 2 hours to obtain a modified graphene with an average particle size of 0.1-20 μm.

Example 10

Graphene oxide, tetramethyl orthosilicate, trimethylsiloxysilicate, sodium hydroxide solution (concentration: 30 g/L), polymaleic anhydride (weight-average molecular weight: 10,000), 610S (concentration: 6 g/L) and P90 (concentration: 1.5 g/L) were mixed according to the weight ratio of 1:1.5:0.5:0.8:0.4:0.1:0.02 and stirred at 40° C. for 2 hours. The solid product was collected and dried at 120° C. for 2 hours to obtain a modified graphene with an average particle size of 0.1-20 μm.

Example 11

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L) and P90 (concentration: 1.5 g/L) were mixed according to the weight ratio of 1:0.5:0.2:1.5:0.8:0.02:0.01 and stirred at 40° C. for 2 hours. The solid product was collected and dried at 120° C. for 2 hours to obtain a modified graphene with an average particle size of 0.1-20 μm.

Example 12

Graphene oxide, tetramethyl orthosilicate, trimethylsiloxysilicate, sodium hydroxide solution (concentration: 30 g/L), polyacrylic acid (weight average molecular weight: 5,000), 610S (concentration: 6 g/L) and P90 (concentration: 1.5 g/L) were mixed according to the weight ratio of 1:2:1:0.1:0.2:0.2:0.1 and stirred at 40° C. for 2 hours. The solid product was collected and dried at 120° C. for 2 hours to obtain a modified graphene with an average particle size of 0.1-20 μm.

Example 13

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L) and P90 (concentration: 1.5 g/L) were mixed according to the weight ratio of 1:1.5:0.5:0.8:0.4:0.1:0.02 and stirred at 50° C. for 1 hour. The solid product was collected and dried at 120° C. for 2 hours to obtain a modified graphene with an average particle size of 0.1-20 μm.

Example 14

Graphene oxide, tetramethyl orthosilicate, trimethylsiloxysilicate, sodium hydroxide solution (concentration: 30 g/L), polyacrylic acid (weight-average molecular weight: 5,000), 610S (concentration: 6 g/L), P90 (concentration: 1.5 g/L) and γ-aminopropyltriethoxysilane were mixed according to the weight ratio of 1:1.5:0.5:0.8:0.4:0.1:0.02:1.2 and stirred at 40° C. for 2 hours. The solid product was collected and dried at 120° C. for 2 hours to obtain a modified graphene with an average particle size of 0.1-20 μm.

Examples 15-29 are cases where the surfactant is a nonionic surfactant.

Example 15

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:1.5:0.5:0.8:0.1:0.15:0.3 and stirred at 40° C. for 2 hours. The solid product was collected and dried at 120° C. for 2 hours to obtain a modified graphene with an average particle size of 0.1-20 µm.

Example 16

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:1.4:1.4:0.6:0.2:0.3:0.3 and stirred at 40° C. for 2 hours. The solid product was collected and dried at 120° C. for 2 hours to obtain a modified graphene with an average particle size of 0.1-20 µm.

Example 17

Graphene oxide, tetramethyl orthosilicate, trimethylsiloxysilicate, sodium hydroxide solution (concentration: 60 g/L), polyacrylic acid (weight-average molecular weight: 5,000), polyvinyl alcohol (weight-average molecular weight: 2,000; concentration: 6 g/L) and polyethylene glycol (weight-average molecular weight: 800; concentration: 8 g/L) were mixed according to the weight ratio of 1:1.5:0.5:0.8:0.1:0.3:0.15 and stirred at 30° C. for 4 hours. The solid product was collected and dried at 120° C. for 2 hours to obtain a modified graphene with an average particle size of 0.1-20 µm.

Example 18

Graphene oxide, tetramethyl orthosilicate, trimethylsiloxysilicate, sodium carbonate solution (concentration: 60 g/L), polyacrylic acid (weight-average molecular weight: 5,000), polyvinyl alcohol (weight-average molecular weight: 2,000; concentration: 6 g/L) and polyethylene glycol (weight-average molecular weight: 800; concentration: 8 g/L) were mixed according to the weight ratio of 1:1:0.8:1:0.08:0.3:0.03 and stirred at 30° C. for 4 hours. The solid product was collected and dried at 120° C. for 2 hours to obtain a modified graphene with an average particle size of 0.1-20 µm.

Example 19

Graphene oxide, tetramethyl orthosilicate, trimethylsiloxysilicate, sodium hydroxide solution (concentration: 30 g/L), polyacrylic acid (weight-average molecular weight: 5,000), Tween20 (concentration: 8 g/L) and Span80 (concentration: 8 g/L) were mixed according to the weight ratio of 1:1.5:0.5:0.8:0.1:0.15:0.3 and stirred at 40° C. for 2 hours. The solid product was collected and dried at 120° C. for 2 hours to obtain a modified graphene with an average particle size of 0.1-20 µm.

Example 20

Graphene oxide, tetramethyl orthosilicate, trimethylsiloxysilicate, sodium hydroxide solution (concentration: 30 g/L), polyacrylic acid (weight-average molecular weight: 5,000) and PVPK17 (concentration: 10 g/L) were mixed according to the weight ratio of 1:1.5:0.5:0.8:0.1:0.45 and stirred at 40° C. for 2 hours. The solid product was collected and dried at 120° C. for 2 hours to obtain a modified graphene with an average particle size of 0.1-20 µm.

Example 21

Graphene oxide, tetramethyl orthosilicate, trimethylsiloxysilicate, sodium hydroxide solution (concentration: 30 g/L), polyacrylic acid (weight-average molecular weight: 5,000) and tributyl phosphate (concentration: 6 g/L) were mixed according to the weight ratio of 1:1.5:0.5:0.8:0.1:0.45 and stirred at 40° C. for 2 hours. The solid product was collected and dried at 120° C. for 2 hours to obtain a modified graphene with an average particle size of 0.1-20 µm.

Example 22

Graphene oxide, tetramethyl orthosilicate, trimethylsiloxysilicate, sodium carbonate solution (concentration: 60 g/L), polyacrylic acid (weight-average molecular weight: 5,000) and polyvinyl alcohol (weight-average molecular weight: 2,000; concentration: 6 g/L) were mixed according to the weight ratio of 1:1.5:0.5:0.8:0.1:0.45 and stirred at 30° C. for 4 hours. The solid product was collected and dried at 120° C. for 2 hours to obtain a modified graphene with an average particle size of 0.1-20 µm.

Example 23

Graphene oxide, tetramethyl orthosilicate, trimethylsiloxysilicate, sodium carbonate solution (concentration: 60 g/L), polyacrylic acid (weight-average molecular weight: 5,000) and polyethylene glycol (weight-average molecular weight: 800; concentration: 8 g/L) were mixed according to the weight ratio of 1:1.5:0.5:0.8:0.1:0.45 and stirred at 30° C. for 4 hours. The solid product was collected and dried at 120° C. for 2 hours to obtain a modified graphene with an average particle size of 0.1-20 µm.

Example 24

Graphene oxide, tetramethyl orthosilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:2:0.8:0.1:0.15:0.3 and stirred at 40° C. for 2 hours. The solid product was collected and dried at 120° C. for 2 hours to obtain a modified graphene with an average particle size of 0.1-20 µm.

Example 25

Graphene oxide, tetramethyl orthosilicate, trimethylsiloxysilicate, sodium hydroxide solution (concentration: 30 g/L), polymaleic anhydride (weight-average molecular weight: 10,000), PVPK17 (concentration: 10 g/L) and tributyl phosphate (concentration: 6 g/L) were mixed according to the weight ratio of 1:1.5:0.5:0.8:0.1:0.15:0.3 and stirred at 40° C. for 2 hours. The solid product was collected and dried at 120° C. for 2 hours to obtain a modified graphene with an average particle size of 0.1-20 µm.

Example 26

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:0.5:0.2:1.5:0.5:0.05:0.05 and stirred at 40° C. for 2 hours. The solid product was collected and dried at 120° C. for 2 hours to obtain a modified graphene with an average particle size of 0.1-20 μm.

Example 27

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:2:1:0.1:0.05:0.3:0.5 and stirred at 40° C. for 2 hours. The solid product was collected and dried at 120° C. for 2 hours to obtain a modified graphene with an average particle size of 0.1-20 μm.

Example 28

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L) and tributyl phosphate (concentration: 6 g/L) were mixed according to the weight ratio of 1:1.5:0.5:0.8:0.1:0.15:0.3 and stirred at 50° C. for 1 hour. The solid product was collected and dried at 120° C. for 2 hours to obtain a modified graphene with an average particle size of 0.1-20 μm.

Example 29

Graphene oxide, tetramethyl orthosilicate, trimethylsiloxysilicate, sodium hydroxide solution (concentration: 30 g/L), polyacrylic acid (weight-average molecular weight: 5,000), PVPK17 (concentration: 10 g/L), tributyl phosphate (concentration: 6 g/L) and γ-aminopropyltriethoxysilane were mixed according to the weight ratio of 1:1.5:0.5:0.8:0.1:0.15:0.3:1.2 and stirred at 40° C. for 2 hours. The solid product was collected and dried at 120° C. for 2 hours to obtain a modified graphene with an average particle size of 0.1-20 μm.

Examples 30-45 are cases where the surfactant consist of an anionic surfactant and a nonionic surfactant.

Example 30

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and PVPK17 (concentration: 10 g/L) were mixed according to the weight ratio of 1:1.5:0.5:0.8:0.4:0.2:0.02 and stirred at 40° C. for 2 hours. The solid product was collected and dried at 120° C. for 2 hours to obtain a modified graphene with an average particle size of 0.1-20 μm.

Example 31

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and PVPK17 (concentration: 10 g/L) were mixed according to the weight ratio of 1:1.4:1.4:0.6:0.6:0.1:0.005 and stirred at 40° C. for 2 hours. The solid product was collected and dried at 120° C. for 2 hours to obtain a modified graphene with an average particle size of 0.1-20 μm.

Example 32

Graphene oxide, tetramethyl orthosilicate, trimethylsiloxysilicate, sodium carbonate solution (concentration: 60 g/L), polyacrylic acid (weight-average molecular weight: 5,000), P90 (concentration: 1.5 g/L) and polyethylene glycol (weight-average molecular weight: 400; concentration: 8 g/L) were mixed according to the weight ratio of 1:1.5:0.5:0.8:0.4:0.1:0.05 and stirred at 30° C. for 4 hours. The solid product was collected and dried at 120° C. for 2 hours to obtain a modified graphene with an average particle size of 0.1-20 μm.

Example 33

Graphene oxide, tetramethyl orthosilicate, trimethylsiloxysilicate, sodium carbonate solution (concentration: 60 g/L), polyacrylic acid (weight-average molecular weight: 5,000), P90 (concentration: 1.5 g/L) and polyethylene glycol (weight-average molecular weight: 400; concentration: 8 g/L) were mixed according to the weight ratio of 1:1:0.8:1:0.3:0.25:0.25 and stirred at 30° C. for 4 hours. The solid product was collected and dried at 120° C. for 2 hours to obtain a modified graphene with an average particle size of 0.1-20 μm.

Example 34

Graphene oxide, tetramethyl orthosilicate, trimethylsiloxysilicate, sodium hydroxide solution (concentration: 30 g/L), polyacrylic acid (weight-average molecular weight: 5,000), P90 (concentration: 1.5 g/L) and PVPK17 (concentration: 10 g/L) were mixed according to the weight ratio of 1:1.5:0.5:0.8:0.4:0.2:0.04 and stirred at 40° C. for 2 hours. The solid product was collected and dried at 120° C. for 2 hours to obtain a modified graphene with an average particle size of 0.1-20 μm.

Example 35

Graphene oxide, tetramethyl orthosilicate, trimethylsiloxysilicate, sodium hydroxide solution (concentration: 30 g/L), polyacrylic acid (weight-average molecular weight: 5,000), P90 (concentration: 1.5 g/L) and PVPK17 (concentration: 10 g/L) were mixed according to the weight ratio of 1:2:0.5:0.7:0.5:0.4:0.06 and stirred at 40° C. for 2 hours. The solid product was collected and dried at 120° C. for 2 hours to obtain a modified graphene with an average particle size of 0.1-20 μm.

Example 36

Graphene oxide, tetramethyl orthosilicate, trimethylsiloxysilicate, sodium hydroxide solution (concentration: 30 g/L), polyacrylic acid (weight-average molecular weight: 5,000), sodium dodecyl sulfate (concentration: 12 g/L) and tributyl phosphate (concentration: 6 g/L) were mixed according to the weight ratio of 1:1.5:0.5:0.8:0.4:0.2:0.02 and stirred at 40° C. for 2 hours. The solid product was collected and dried at 120° C. for 2 hours to obtain a modified graphene with an average particle size of 0.1-20 μm.

Example 37

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and Tween20 (concentration: 8 g/L) were mixed according to the weight ratio of 1:1.5:0.5:0.8:0.4:0.2:0.02 and stirred at 40° C. for 2 hours. The solid product was collected and dried at 120° C. for 2 hours to obtain a modified graphene with an average particle size of 0.1-20 μm.

Example 38

Graphene oxide, tetramethyl orthosilicate, trimethylsiloxysilicate, sodium hydroxide solution (concentration: 30 g/L), polyacrylic acid (weight-average molecular weight: 5,000), P90 (concentration: 1.5 g/L) and polyvinyl alcohol (weight-average molecular weight: 1,800; concentration: 6 g/L) were mixed according to the weight ratio of 1:1.5:0.5:0.8:0.4:0.2:0.04 and stirred at 40° C. for 2 hours. The solid product was collected and dried at 120° C. for 2 hours to obtain a modified graphene with an average particle size of 0.1-20 μm.

Example 39

Graphene oxide, tetramethyl orthosilicate, sodium hydroxide solution (concentration: 30 g/L), polyacrylic acid (weight-average molecular weight: 5,000), P90 (concentration: 1.5 g/L) and PVPK17 (concentration: 10 g/L) were mixed according to the weight ratio of 1:2:0.8:0.4:0.2:0.04 and stirred at 40° C. for 2 hours. The solid product was collected and dried at 120° C. for 2 hours to obtain a modified graphene with an average particle size of 0.1-20 μm.

Example 40

Graphene oxide, tetramethyl orthosilicate, trimethylsiloxysilicate, sodium hydroxide solution (concentration: 30 g/L), polymaleic anhydride (weight-average molecular weight: 10,000), P90 (concentration: 1.5 g/L) and PVPK17 (concentration: 10 g/L) were mixed according to the weight ratio of 1:1.5:0.5:0.8:0.4:0.2:0.04 and stirred at 40° C. for 2 hours. The solid product was collected and dried at 120° C. for 2 hours to obtain a modified graphene with an average particle size of 0.1-20 μm.

Example 41

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and PVPK17 (concentration: 10 g/L) were mixed according to the weight ratio of 1:2:2:2:0.8:0.6:0.12 and stirred at 40° C. for 2 hours. The solid product was collected and dried at 120° C. for 2 hours to obtain a modified graphene with an average particle size of 0.1-20 μm.

Example 42

Graphene oxide, tetramethyl orthosilicate, trimethylsiloxysilicate, sodium carbonate solution (concentration: 60 g/L), polyacrylic acid (weight-average molecular weight: 5,000), P90 (concentration: 1.5 g/L) and polyethylene glycol (weight-average molecular weight: 400; concentration: 8 g/L) were mixed according to the weight ratio of 1:2:1:0.1:0.1:0.3:0.3 and stirred at 30° C. for 4 hours. The solid product was collected and dried at 120° C. for 2 hours to obtain a modified graphene with an average particle size of 0.1-20 μm.

Example 43

Graphene oxide, tetramethyl orthosilicate, trimethylsiloxysilicate, sodium hydroxide solution (concentration: 30 g/L), polyacrylic acid (weight-average molecular weight: 5,000), P90 (concentration: 1.5 g/L) and PVPK17 (concentration: 10 g/L) were mixed according to the weight ratio of 1:0.5:0.2:1.5:0.8:0.04:0.01 and stirred at 40° C. for 2 hours. The solid product was collected and dried at 120° C. for 2 hours to obtain a modified graphene with an average particle size of 0.1-20 μm.

Example 44

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L) and PVPK17 (concentration: 10 g/L) were mixed according to the weight ratio of 1:1.5:0.5:0.8:0.4:0.2:0.02 and stirred at 50° C. for 1 hour. The solid product was collected and dried at 120° C. for 2 hours to obtain a modified graphene with an average particle size of 0.1-20 μm.

Example 45

Graphene oxide, tetramethyl orthosilicate, trimethylsiloxysilicate, sodium hydroxide solution (concentration: 30 g/L), polyacrylic acid (weight-average molecular weight: 5,000), PAAS (concentration: 2.6 g/L), PVPKA17 (concentration: 10 g/L) and γ-aminopropyltriethoxysilane were mixed according to the weight ratio of 1:1.5:0.5:0.8:0.4:0.2:0.02:1.2 and stirred at 40° C. for 2 hours. The solid product was collected and dried at 120° C. for 2 hours to obtain a modified graphene with an average particle size of 0.1-20 μm.

Examples 46-52 are cases where the surfactant consist of a cationic surfactant and/or a zwitterionic surfactant.

Example 46

Graphene oxide, tetramethyl orthosilicate, trimethylsiloxysilicate, sodium hydroxide solution (concentration: 30 g/L), polyacrylic acid (weight-average molecular weight: 5,000) and cetyltrimethylammonium bromide were mixed according to the weight ratio of 1:1:0.2:2.5:0.2:0.2, reacted at 40° C. for 2 hours, and then dried at 120° C. for 2 hours to obtain a modified graphene with an average particle size of 0.1-20 μm.

Example 47

Graphene oxide, tetramethyl orthosilicate, trimethylsiloxysilicate, sodium carbonate solution (concentration: 60 g/L), polyacrylic acid (weight-average molecular weight: 5,000) and triethanolamine were mixed according to the weight ratio of 1:0.5:0.5:1.3:0.1:0.4, reacted at 30° C. for 4 hours, and then dried at 120° C. for 2 hours to obtain a modified graphene with an average particle size of 0.1-20 μm.

Example 48

Graphene oxide, tetramethyl orthosilicate, sodium hydroxide solution (concentration: 30 g/L), polyacrylic acid (weight-average molecular weight: 5,000) and cetyltrimethylammonium bromide were mixed according to the weight ratio of 1:1.2:2.5:0.2:0.2, reacted at 40° C. for 2 hours, and then dried at 120° C. for 2 hours to obtain a modified graphene with an average particle size of 0.1-20 μm.

Example 49

Graphene oxide, tetramethyl orthosilicate, trimethylsiloxysilicate, sodium hydroxide solution (concentration: 30 g/L), polyacrylic acid (weight-average molecular weight: 5,000) and cetyltrimethylammonium bromide were mixed according to the weight ratio of 1:1:1:0.2:0.5:0.02, reacted at 40° C. for 2 hours, and then dried at 120° C. for 2 hours to obtain a modified graphene with an average particle size of 0.1-20 μm.

Example 50

Graphene oxide, tetramethyl orthosilicate, trimethylsiloxysilicate, sodium hydroxide solution (concentration: 30 g/L), polyacrylic acid (weight-average molecular weight: 5,000) and cetyltrimethylammonium bromide were mixed according to the weight ratio of 1:0.3:0.2:3:0.05:1, reacted at 40° C. for 2 hours, and then dried at 120° C. for 2 hours to obtain a modified graphene with an average particle size of 0.1-20 μm.

Example 51

Graphene oxide, tetramethyl orthosilicate, trimethylsiloxysilicate, sodium hydroxide solution (concentration: 30 g/L), polyacrylic acid (weight-average molecular weight: 5,000) and cetyltrimethylammonium bromide were mixed according to the weight ratio of 1:1:0.2:2.5:0.2:0.2, reacted at 50° C. for 1 hour, and then dried at 120° C. for 2 hours to obtain a modified graphene with an average particle size of 0.1-20 μm.

Example 52

Graphene oxide, tetramethyl orthosilicate, trimethylsiloxysilicate, sodium hydroxide solution (concentration: 30 g/L), polymaleic anhydride (weight-average molecular weight: 10,000) and cetyltrimethylammonium bromide were mixed according to the weight ratio of 1:1:0.2:2.5:0.2:0.2, reacted at 40° C. for 2 hours, and then dried at 120° C. for 2 hours to obtain a modified graphene with an average particle size of 0.1-20 μm.

Test Example 1

The thermal conductivity and electrical conductivity of the modified graphene prepared in Examples 1-52. The thermal conductivity was tested according to ASTM D5470 and the electrical conductivity was tested according to Q/JSGL 006-2014. The test results are listed in Table 1.

TABLE 1

| Example | Thermal conductivity, W/(m · K) | Electrical conductivity, S/m |
|---|---|---|
| Example 1 | 88.6 | 124 |
| Example 2 | 89.3 | 118 |
| Example 3 | 86.0 | 72 |
| Example 4 | 85.2 | 77 |
| Example 5 | 93.2 | 68 |
| Example 6 | 94.6 | 65 |
| Example 7 | 82.6 | 136 |
| Example 8 | 83.1 | 140 |
| Example 9 | 84.4 | 116 |
| Example 10 | 82.8 | 132 |
| Example 11 | 82.1 | 141 |
| Example 12 | 80.1 | 145 |
| Example 13 | 84.6 | 118 |
| Example 14 | 94.2 | 61 |
| Example 15 | 73.3 | 206 |
| Example 16 | 74.1 | 198 |
| Example 17 | 68.2 | 186 |
| Example 18 | 68.8 | 182 |
| Example 19 | 57.8 | 232 |
| Example 20 | 65.2 | 217 |
| Example 21 | 68.7 | 214 |
| Example 22 | 64.3 | 225 |
| Example 23 | 62.2 | 229 |
| Example 24 | 63.4 | 219 |
| Example 25 | 60.4 | 223 |
| Example 26 | 58.5 | 231 |
| Example 27 | 57.2 | 234 |
| Example 28 | 55.8 | 236 |
| Example 29 | 74.5 | 184 |
| Example 30 | 132.2 | 86 |
| Example 31 | 134.7 | 81 |
| Example 32 | 124.3 | 50 |
| Example 33 | 123.0 | 56 |
| Example 34 | 144.5 | 44 |
| Example 35 | 143.8 | 47 |
| Example 36 | 105.4 | 132 |
| Example 37 | 116.9 | 119 |
| Example 38 | 112.1 | 126 |
| Example 39 | 115.5 | 120 |
| Example 40 | 109.6 | 128 |
| Example 41 | 110.1 | 125 |
| Example 42 | 105.7 | 135 |
| Example 43 | 116.8 | 118 |
| Example 44 | 108.2 | 131 |
| Example 45 | 139.2 | 85 |
| Example 46 | 80.2 | 146 |
| Example 47 | 87.6 | 133 |
| Example 48 | 73.3 | 160 |
| Example 49 | 66.6 | 195 |
| Example 50 | 55.2 | 242 |
| Example 51 | 71.2 | 172 |
| Example 52 | 60.3 | 233 |

It can be seen from Table 1 that the modified graphene prepared by the method of the present disclosure has a higher thermal conductivity and a lower electrical conductivity.

In embodiments where the surfactant is an anionic surfactant, it is seen from the comparison between Examples 1-6 and Examples 7-8 that the use of anionic surfactants in particular combination and ratio is beneficial to improve the thermal conductivity and/or reduce the electrical conductivity of the modified graphene. It can be seen from the results of Example 1-2 that when the anionic surfactant consists of PAAS and P90 and the weight ratio between PAAS and P90 is 1:(0.5-1.2), it is beneficial to improve the thermal conductivity of the modified graphene. It can be seen from the results of Examples 3-4 that when the anionic surfactant consists of sodium dodecylbenzene sulfonate and sodium lignosulfonate and the weight ratio between sodium dodecylbenzene sulfonate and sodium lignosulfonate is 1:(1-2), it is beneficial to reduce the electrical conductivity of modified graphene. It can be seen from the results of Examples 5-6 that when the anionic surfactant consists of 610S and P90 and the weight ratio between 610S and P90 is 1:(0.05-0.5), it is beneficial to further improve the thermal conductivity and reduce the conductivity of modified graphene. It can be seen from the comparison between Example 5 and Examples 9-10 that when the silicate ester consists of tetramethyl orthosilicate and trimethylsiloxysilicate and the weight ratio between tetramethyl orthosilicate and trimethylsiloxysilicate is 1:(0.1-1), or when the water-soluble polymer compound is polyacrylic acid having a weight average molecular weight of 5,000 to 20,000, it is beneficial to further improve the thermal conductivity and reduce the electrical conductivity of modified graphene. It can be seen from the comparison between Example 5 and Examples 11-12 that when the weight ratio among the graphene oxide, silicate ester, inorganic alkali solution, water-soluble polymer compound and anionic surfactant is 1:(1.8-2.8):(0.6-1):(0.3-0.6):(0.1-0.25), it is beneficial to further improve the thermal conductivity and reduce electrical conductivity of modified graphene.

In embodiments where the surfactant is a nonionic surfactant, it is seen from the comparison between Examples 15-18 and Examples 19-23 that the use of nonionic surfactants in particular combination and ratio is beneficial to improve the thermal conductivity and/or reduce the electrical conductivity of the modified graphene. It can be seen from the results of Examples 15-16 that when the nonionic surfactant consists of PVPK17 and tributyl phosphate and the weight ratio between PVPK17 and tributyl phosphate is 1:(1-2), it is beneficial to improve the thermal conductivity of the modified graphene. It can be seen from the results of Examples 17-18 that when the nonionic surfactant consists of polyvinyl alcohol and polyethylene glycol and the weight ratio between polyvinyl alcohol and polyethylene glycol is 1:(0.1-0.6), it is beneficial to reduce the electrical conductivity of modified graphene. It can be seen from the comparison between Example 15 and Examples 24-25 that when the silicate ester consists of tetramethyl orthosilicate and trimethylsiloxysilicate and the weight ratio between tetramethyl orthosilicate and trimethylsiloxysilicate is 1:(0.1-1), or when the water-soluble polymer compound is polyacrylic acid having a weight-average molecular weight of 5,000 to 20,000, it is beneficial to further improve the thermal conductivity and reduce the electrical conductivity of modified graphene. It can be seen from the comparison between Example 15 and Examples 26-27 that when the weight ratio among the graphene oxide, silicate ester, inorganic alkali solution, water-soluble polymer compound and nonionic surfactant is 1:(1.8-2.8):(0.6-1):(0.08-0.25):(0.3-0.6), it is beneficial to further improve the thermal conductivity and reduce electrical conductivity of modified graphene.

In embodiments where the surfactant consists of an anionic surfactant and a nonionic surfactant, it is seen from the comparison between Examples 30-35 and Examples 36-38 that the use of surfactants in particular combination and ratio is beneficial to improve the thermal conductivity and/or reduce the electrical conductivity of the modified graphene. It can be seen from the results of Example 30-31 that when the anionic surfactant consists of PAAS and PVPK17 and the weight ratio between PAAS and PVPK17 is 1:(0.01-0.2), it is beneficial to improve the thermal conductivity of the modified graphene. It can be seen from the results of Examples 32-33 that when the surfactant consists of P90 and polyethylene glycol and the weight ratio between P90 and polyethylene glycol is 1:(0.5-1), it is beneficial to reduce the conductivity of modified graphene. It can be seen from the results of Examples 34-35 that when the surfactant consists of P90 and PVPK17 and the weight ratio between P90 and PVPK17 is 1:(0.15-0.35), it is beneficial to further improve the thermal conductivity and reduce the conductivity of modified graphene. It can be seen from the comparison between Example 34 and Examples 39-40 that when the silicate ester consists of tetramethyl orthosilicate and trimethylsiloxysilicate and the weight ratio between tetramethyl orthosilicate and trimethylsiloxysilicate is 1:(0.1-1), or when the water-soluble polymer compound is polyacrylic acid having a weight average molecular weight of 5,000 to 20,000, it is beneficial to further improve the thermal conductivity and reduce the electrical conductivity of modified graphene. It can be seen from the comparison between Examples 30, 32, 34 and Examples 41-43 that when the weight ratio among the graphene oxide, silicate, inorganic alkali solution, water-soluble polymer compound and surfactant is 1:(1.8-2.8):(0.6-1):(0.2-0.6):(0.1-0.5), it is beneficial to further improve the thermal conductivity and reduce electrical conductivity of modified graphene.

Examples 53-87 illustrate the thermal conductive composition provided by the present disclosure.

Example 53

In the thermal conductive composition of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 $m^2/g$) and the modified graphene prepared in Example 1 and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present example.

Examples 54-60

The thermal conductive composition was prepared according to the method of Example 53, except that the modified graphene prepared in Examples 3, 5, 7, 9, 10, 11, and 12 were respectively used.

Example 61

In the thermal conductive composition of this example, the silicone oil is vinyl silicone oil (viscosity at 25° CL: 400,000 cSt); the first filler consists of copper and polyethylene wax (phase transition temperature: 56-60° C.) and the weight ratio between copper and polyethylene wax is 1:1.8; the second filler consists of carbon nanotubes (purity≥95% by weight, ash content≤0.2% by weight, and specific surface area: 100-200 $m^2/g$) and the modified graphene prepared in Example 1 and the weight ratio between carbon nanotubes and the modified graphene is 1:15.

100 parts by weight of silicone oil, 24 parts by weight of the first filler, and 108 parts by weight of the second filler were mixed and stirred for 30 minutes, and then placed in a counter-roll mill for grinding for 1 hour to obtain the thermal conductive composition of the present example.

Example 62

In the thermal conductive composition of this example, the silicone oil is hydroxy silicone oil (viscosity at 25° CL: 250,000 cSt); the first filler consists of zinc oxide and polyethylene glycol (molecular weight: 6,000, phase transition temperature: 60-65° C.) and the weight ratio between zinc oxide and polyethylene glycol is 1:1.5; the second filler consists of carbon nanotubes (purity≥95% by weight, ash content≤0.2% by weight, and specific surface area: 100-200 $m^2/g$) and the modified graphene prepared in Example 1, and the weight ratio between carbon nanotubes and the modified graphene is 1:6.

100 parts by weight of silicone oil, 35 parts by weight of the first filler, and 96 parts by weight of the second filler were mixed and stirred for 30 minutes, and then placed in a counter-roll mill for grinding for 1 hour to obtain the thermal conductive composition of the present example.

Example 63

The components of the thermal conductive composition of this example are the same as those of Example 53.

100 parts by weight of silicone oil, 40 parts by weight of the first filler, and 80 parts by weight of the second filler were mixed and stirred for 30 minutes, and then placed in a counter-roll mill for grinding for 1 hour to obtain the thermal conductive composition of the present example.

Example 64

The components of the thermal conductive composition of this example are the same as those of Example 53.

100 parts by weight of silicone oil, 20 parts by weight of the first filler, and 120 parts by weight of the second filler were mixed and stirred for 30 minutes, and then placed in a counter-roll mill for grinding for 1 hour to obtain the thermal conductive composition of the present example.

Example 65

The components of the thermal conductive composition of this example are the same as those of Example 53.

100 parts by weight of silicone oil, 10 parts by weight of the first filler, and 130 parts by weight of the second filler were mixed and stirred for 30 minutes, and then placed in a counter-roll mill for grinding for 1 hour to obtain the thermal conductive composition of the present example.

Example 66

The components of the thermal conductive composition of this example are the same as those of Example 53.

100 parts by weight of silicone oil, 50 parts by weight of the first filler, and 60 parts by weight of the second filler were mixed and stirred for 30 minutes, and then placed in a counter-roll mill for grinding for 1 hour to obtain the thermal conductive composition of the present example.

Example 67

The difference between the thermal conductive composition of this example and that of Example 53 is that the first filler is a capsule with a particle size of 50-80 nm formed by wrapping zinc oxide with polyethylene glycol.

Example 68

The difference between the thermal conductive composition of this example and that of Example 53 is that the first filler consists of alumina and liquid paraffin (phase transition temperature: 55-58° C.) and the weight ratio between alumina and liquid paraffin is 1:1.2.

Example 69

The difference between the thermal conductive composition of this example and that of Example 53 is that the first filler consists of silver and urea (phase transition temperature: 50-56° C.) and the weight ratio between silver and urea is 1:1.8.

Example 70

In the thermal conductive silicone grease of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1; the second filler consists of carbon nanotubes (purity≥95% by weight, ash content≤0.2% by weight, and specific surface area: 100-200 $m^2/g$) and the modified graphene prepared in Example 1 and the weight ratio between carbon nanotubes and the modified graphene is 1:10; the auxiliary agent consists of N,N'-diaryl-p-phenylenediamine and mineral oil and the weight ratio between N,N'-diaryl-p-phenylenediamine and mineral oil is 1:0.5.

100 parts by weight of silicone oil, 30 parts by weight of the first filler, 100 parts by weight of the second filler, and 2 parts by weight of the auxiliary agent were mixed and stirred for 30 minutes, and then placed in a counter-roll mill for grinding for 1 hour to obtain the thermal conductive silicone grease of the present example.

Example 71

In the thermal conductive composition of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 $m^2/g$) and the modified graphene prepared in Example 15 and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present example.

Examples 72-77

The thermal conductive composition was prepared according to the method of Example 71, except that the modified graphene prepared in Examples 17, 19, 24, 25, 26, and 27 were respectively used.

Example 78

In the thermal conductive composition of this example, the silicone oil is vinyl silicone oil (viscosity at 25° CL: 400,000 cSt); the first filler consists of copper and polyethylene wax (phase transition temperature: 56-60° C.) and the weight ratio between copper and polyethylene wax is 1:1.8; the second filler consists of carbon nanotubes (purity≥95% by weight, ash content≤0.2% by weight, and specific surface area: 100-200 $m^2$/g) and the modified graphene prepared in Example 15 and the weight ratio between carbon nanotubes and the modified graphene is 1:15.

100 parts by weight of silicone oil, 24 parts by weight of the first filler, and 108 parts by weight of the second filler were mixed and stirred for 30 minutes, and then placed in a counter-roll mill for grinding for 1 hour to obtain the thermal conductive composition of the present example.

Example 79

In the thermal conductive composition of this example, the silicone oil is hydroxy silicone oil (viscosity at 25° CL: 250,000 cSt); the first filler consists of zinc oxide and polyethylene glycol (molecular weight: 6,000, phase transition temperature: 60-65° C.) and the weight ratio between zinc oxide and polyethylene glycol is 1:1.5; the second filler consists of carbon nanotubes (purity≥95% by weight, ash content≤0.2% by weight, and specific surface area: 100-200 $m^2$/g) and the modified graphene prepared in Example 15 and the weight ratio between carbon nanotubes and the modified graphene is 1:6.

100 parts by weight of silicone oil, 35 parts by weight of the first filler, and 96 parts by weight of the second filler were mixed and stirred for 30 minutes, and then placed in a counter-roll mill for grinding for 1 hour to obtain the thermal conductive composition of the present example.

Example 80

The components of the thermal conductive composition of this example are the same as those of Example 71.

100 parts by weight of silicone oil, 40 parts by weight of the first filler, and 80 parts by weight of the second filler were mixed and stirred for 30 minutes, and then placed in a counter-roll mill for grinding for 1 hour to obtain the thermal conductive composition of the present example.

Example 81

The components of the thermal conductive composition of this example are the same as those of Example 71.

100 parts by weight of silicone oil, 20 parts by weight of the first filler, and 120 parts by weight of the second filler were mixed and stirred for 30 minutes, and then placed in a counter-roll mill for grinding for 1 hour to obtain the thermal conductive composition of the present example.

Example 82

The components of the thermal conductive composition of this example are the same as those of Example 71.

100 parts by weight of silicone oil, 10 parts by weight of the first filler, and 130 parts by weight of the second filler were mixed and stirred for 30 minutes, and then placed in a counter-roll mill for grinding for 1 hour to obtain the thermal conductive composition of the present example.

Example 83

The components of the thermal conductive composition of this example are the same as those of Example 71.

100 parts by weight of silicone oil, 50 parts by weight of the first filler, and 60 parts by weight of the second filler were mixed and stirred for 30 minutes, and then placed in a counter-roll mill for grinding for 1 hour to obtain the thermal conductive composition of the present example.

Example 84

The difference between the thermal conductive composition of this example and that of Example 71 is that the first filler is a capsule with a particle size of 50-80 nm formed by wrapping zinc oxide with polyethylene glycol.

Example 85

The difference between the thermal conductive composition of this example and that of Example 71 is that the first filler consists of alumina and liquid paraffin (phase transition temperature: 55-58° C.) and the weight ratio between alumina and liquid paraffin is 1:1.2.

Example 86

The difference between the thermal conductive composition of this example and that of Example 71 is that the first filler consists of silver and urea (phase transition temperature: 50-56° C.) and the weight ratio between silver and urea is 1:1.8.

Example 87

In the thermal conductive silicone grease of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1; the second filler consists of carbon nanotubes (purity≥95% by weight, ash content≤0.2% by weight, and specific surface area: 100-200 $m^2$/g) and the modified graphene prepared in Example 15 and the weight ratio between carbon nanotubes and the modified graphene is 1:10; the auxiliary agent consists of N,N'-diaryl-p-phenylenediamine and mineral oil and the weight ratio between N,N'-diaryl-p-phenylenediamine and mineral oil is 1:0.5.

100 parts by weight of silicone oil, 30 parts by weight of the first filler, 100 parts by weight of the second filler, and 2 parts by weight of the auxiliary agent were mixed and stirred for 30 minutes, and then placed in a counter-roll mill for grinding for 1 hour to obtain the thermal conductive composition of the present example.

Comparative Examples 1-13 illustrate thermal conductive compositions different from those of the present disclosure.

Comparative Example 1

The components of the thermal conductive composition of this comparative example is the same as those of Example 53, except that 100 parts by weight of silicone oil, 65 parts by weight of the first filler, and 45 parts by weight of the second filler were mixed and stirred for 30 minutes, and then placed in a counter-roll mill for grinding for 1 hour to obtain the thermal conductive composition of the present example.

Comparative Example 2

The components of the thermal conductive composition of this comparative example is the same as those of Example 53, except that 100 parts by weight of silicone oil, 5 parts by weight of the first filler, and 155 parts by weight of the second filler were mixed and stirred for 30 minutes, and then placed in a counter-roll mill for grinding for 1 hour to obtain the thermal conductive composition of the present example.

Comparative Example 3

In the thermal conductive composition of this comparative example, the silicone oil is dimethyl silicone oil (viscosity at 25° C L: 450,000 cSt); the first filler consists of zinc oxide and polyethylene glycol (molecular weight: 6,000, phase transition temperature: 60-65° C.) and the weight ratio between zinc oxide and polyethylene glycol is 1:0.1; the second filler consists of carbon nanotubes (purity≥95% by weight, ash content≤0.2% by weight, and specific surface area: 100-200 m$^2$/g) and the modified graphene prepared in Example 1, and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 4

In the thermal conductive composition of this comparative example, the silicone oil is dimethyl silicone oil (viscosity at 25° C L: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 m$^2$/g) and the modified graphene prepared in Example 1, and the weight ratio between carbon nanotubes and the modified graphene is 1:0.5.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 5

The difference between the thermal conductive composition of this comparative example and that of Example 53 is that the first filler consists of zinc oxide only.

Comparative Example 6

The difference between the thermal conductive composition of this comparative example and that of Example 53 is that the second filler consists of modified graphene only.

Comparative Example 7

The difference between the thermal conductive composition of this comparative example and that of Example 53 is that graphene oxide of the second filler was not modified, that is, the same amount of graphene oxide was used to replace the modified graphene in Example 1.

Comparative Example 8

The components of the thermal conductive composition of this comparative example is the same as those of Example 71, except that 100 parts by weight of silicone oil, 65 parts by weight of the first filler, and 45 parts by weight of the second filler were mixed and stirred for 30 minutes, and then placed in a counter-roll mill for grinding for 1 hour to obtain the thermal conductive composition of the present comparative example.

Comparative Example 9

The components of the thermal conductive composition of this comparative example is the same as those of Example 71, except that 100 parts by weight of silicone oil, 5 parts by weight of the first filler, and 155 parts by weight of the second filler were mixed and stirred for 30 minutes, and then placed in a counter-roll mill for grinding for 1 hour to obtain the thermal conductive composition of the present comparative example.

Comparative Example 10

In the thermal conductive composition of this comparative example, the silicone oil is dimethyl silicone oil (viscosity at 25° C L: 450,000 cSt); the first filler consists of zinc oxide and polyethylene glycol (molecular weight: 6,000, phase transition temperature: 60-65° C.) and the weight ratio between zinc oxide and polyethylene glycol is 1:0.1; the second filler consists of carbon nanotubes (purity≥95% by weight, ash content≤0.2% by weight, and specific surface area: 100-200 m$^2$/g) and the modified graphene prepared in Example 15, and the a weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 11

In the thermal conductive composition of this comparative example, the silicone oil is dimethyl silicone oil (viscosity at 25° C L: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 m$^2$/g) and the modified graphene prepared in Example 15, and the weight ratio between carbon nanotubes and the modified graphene is 1:0.5.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 12

The difference between the thermal conductive composition of this comparative example and that of Example 71 is that the first filler consists of zinc oxide only.

Comparative Example 13

The difference between the thermal conductive composition of this comparative example and that of Example 71 is that the second filler consists of modified graphene only.

Test Example 2

The thermal conductivity, thermal resistance and electrical conductivity of the modified graphene prepared in Examples 53-87 and Comparative Examples 1-13 were tested, wherein the thermal conductivity and thermal resistance were tested according to ASTM D5470 and the electrical conductivity was tested according to Q/JSGL 006-2014. The test results are listed in Table 2.

TABLE 2

| Example | Thermal conductivity, W/m · K | Thermal resistance, K · m$^2$/W | Electrical conductivity, S/m |
|---|---|---|---|
| Example 53 | 6.26 | 0.0000083 | 212 |
| Example 54 | 6.21 | 0.0000086 | 194 |
| Example 55 | 6.34 | 0.0000077 | 185 |
| Example 56 | 6.09 | 0.0000091 | 220 |
| Example 57 | 6.02 | 0.0000093 | 226 |
| Example 58 | 5.95 | 0.0000095 | 231 |
| Example 59 | 5.82 | 0.0000098 | 243 |
| Example 60 | 5.77 | 0.00001 | 249 |
| Example 61 | 6.41 | 0.0000072 | 206 |
| Example 62 | 6.35 | 0.0000075 | 209 |
| Example 63 | 6.10 | 0.0000090 | 232 |
| Example 64 | 6.01 | 0.0000093 | 246 |
| Example 65 | 5.75 | 0.000011 | 253 |
| Example 66 | 5.64 | 0.000013 | 259 |
| Example 67 | 6.35 | 0.0000076 | 214 |
| Example 68 | 5.56 | 0.000014 | 239 |
| Example 69 | 5.49 | 0.000015 | 247 |
| Example 70 | 6.45 | 0.0000068 | 209 |
| Example 71 | 6.09 | 0.0000086 | 242 |
| Example 72 | 5.98 | 0.0000089 | 221 |
| Example 73 | 5.82 | 0.0000094 | 264 |
| Example 74 | 5.75 | 0.0000096 | 268 |
| Example 75 | 5.71 | 0.0000097 | 273 |
| Example 76 | 5.62 | 0.0000099 | 277 |
| Example 77 | 5.56 | 0.000011 | 282 |
| Example 78 | 6.12 | 0.0000078 | 285 |
| Example 79 | 6.16 | 0.0000076 | 298 |
| Example 80 | 5.88 | 0.0000092 | 306 |
| Example 81 | 5.76 | 0.0000095 | 308 |
| Example 82 | 5.62 | 0.000012 | 311 |
| Example 83 | 5.51 | 0.000014 | 312 |
| Example 84 | 6.17 | 0.0000076 | 256 |
| Example 85 | 5.38 | 0.000016 | 276 |
| Example 86 | 5.20 | 0.000017 | 288 |
| Example 87 | 6.21 | 0.0000072 | 240 |
| Comparative Example 1 | 3.80 | 0.00002 | 276 |
| Comparative Example 2 | 2.51 | 0.000052 | 282 |
| Comparative Example 3 | 2.63 | 0.000048 | 279 |
| Comparative Example 4 | 1.45 | 0.000078 | 295 |
| Comparative Example 5 | 2.65 | 0.00004 | 334 |
| Comparative Example 6 | 2.84 | 0.000035 | 272 |
| Comparative Example 7 | 4.85 | 0.000018 | 268 |
| Comparative Example 8 | 3.77 | 0.000024 | 326 |
| Comparative Example 9 | 2.45 | 0.000056 | 347 |
| Comparative Example 10 | 2.56 | 0.000053 | 351 |
| Comparative Example 11 | 1.38 | 0.000082 | 366 |
| Comparative Example 12 | 2.61 | 0.000045 | 345 |
| Comparative Example 13 | 2.72 | 0.000039 | 339 |

It can be seen from Table 2 that the thermal conductive composition of the present disclosure has a higher thermal conductivity, a lower thermal resistance and a lower electrical conductivity.

Test Example 3

The effects of the thermal conductive compositions of Examples 53-87 and Comparative Examples 1-13 in CPU heat dissipation uses were tested. Test object: a 30 W CPU chip equipped with a 25 W heat sink. The thermal conductive compositions of Examples 53-87 and Comparative Example 1-13 were respectively coated between the CPU chip and the heat sink with a thickness of 0.06 mm, the power was turned on, and then at the room temperature (20° C.), the temperature of the CPU chip and the heat sink was tested every two minutes within 20 minutes of applying of the thermal conductive composition, and the temperature difference was calculated. The test results are listed in Table 3.

TABLE 3

| Example | \multicolumn{10}{c}{Temperature difference, ° C.} | | | | | | | | | |
|---|---|---|---|---|---|---|---|---|---|---|
| | 2 min | 4 min | 6 min | 8 min | 10 min | 12 min | 14 min | 16 min | 18 min | 20 min |
| Example 53 | 0 | 0 | 0 | 0.1 | 0.1 | 0.2 | 0.2 | 0.3 | 0.5 | 0.7 |
| Example 54 | 0 | 0 | 0.1 | 0.1 | 0.2 | 0.2 | 0.4 | 0.5 | 0.7 |
| Example 55 | 0 | 0 | 0 | 0.1 | 0.1 | 0.1 | 0.2 | 0.3 | 0.5 | 0.6 |
| Example 56 | 0 | 0 | 0.1 | 0.2 | 0.2 | 0.3 | 0.4 | 0.6 | 0.6 | 0.8 |
| Example 57 | 0 | 0 | 0.1 | 0.2 | 0.3 | 0.3 | 0.5 | 0.6 | 0.7 | 0.8 |
| Example 58 | 0 | 0 | 0.1 | 0.2 | 0.4 | 0.5 | 0.7 | 0.7 | 0.9 |
| Example 59 | 0 | 0.1 | 0.2 | 0.3 | 0.3 | 0.5 | 0.6 | 0.8 | 0.8 | 1.0 |
| Example 60 | 0 | 0.1 | 0.2 | 0.3 | 0.4 | 0.6 | 0.7 | 0.8 | 0.9 | 1.1 |
| Example 61 | 0 | 0 | 0 | 0.1 | 0.1 | 0.1 | 0.2 | 0.3 | 0.4 | 0.6 |
| Example 62 | 0 | 0 | 0 | 0.1 | 0.1 | 0.2 | 0.2 | 0.3 | 0.5 | 0.7 |
| Example 63 | 0 | 0 | 0.1 | 0.2 | 0.3 | 0.4 | 0.4 | 0.6 | 0.7 | 0.9 |

TABLE 3-continued

| Example | \multicolumn{10}{c}{Temperature difference, ° C.} |
|---|---|---|---|---|---|---|---|---|---|---|

| Example | 2 min | 4 min | 6 min | 8 min | 10 min | 12 min | 14 min | 16 min | 18 min | 20 min |
|---|---|---|---|---|---|---|---|---|---|---|
| Example 64 | 0 | 0 | 0.1 | 0.2 | 0.3 | 0.4 | 0.5 | 0.6 | 0.7 | 0.9 |
| Example 65 | 0 | 0.1 | 0.2 | 0.3 | 0.4 | 0.6 | 0.7 | 0.9 | 0.9 | 1.1 |
| Example 66 | 0 | 0.1 | 0.2 | 0.3 | 0.4 | 0.5 | 0.7 | 0.8 | 0.9 | 1.1 |
| Example 67 | 0 | 0 | 0 | 0.1 | 0.1 | 0.1 | 0.2 | 0.2 | 0.4 | 0.6 |
| Example 68 | 0 | 0.1 | 0.2 | 0.4 | 0.5 | 0.6 | 0.8 | 0.9 | 1.0 | 1.2 |
| Example 69 | 0 | 0.1 | 0.2 | 0.4 | 0.6 | 0.6 | 0.9 | 1.0 | 1.1 | 1.3 |
| Example 70 | 0 | 0 | 0 | 0.1 | 0.1 | 0.2 | 0.2 | 0.3 | 0.4 | 0.7 |
| Example 71 | 0 | 0 | 0 | 0.1 | 0.2 | 0.2 | 0.3 | 0.4 | 0.6 | 0.7 |
| Example 72 | 0 | 0 | 0 | 0.1 | 0.2 | 0.3 | 0.3 | 0.4 | 0.7 | 0.7 |
| Example 73 | 0 | 0 | 0.1 | 0.2 | 0.3 | 0.4 | 0.5 | 0.6 | 0.7 | 0.9 |
| Example 74 | 0 | 0 | 0.1 | 0.2 | 0.4 | 0.4 | 0.6 | 0.7 | 0.8 | 0.9 |
| Example 75 | 0 | 0.1 | 0.2 | 03 | 0.4 | 0.5 | 0.6 | 0.8 | 0.9 | 1.0 |
| Example 76 | 0 | 0.1 | 0.2 | 0.3 | 0.4 | 0.6 | 0.7 | 0.8 | 1.0 | 1.1 |
| Example 77 | 0 | 0.1 | 0.2 | 0.3 | 0.5 | 0.7 | 0.8 | 0.9 | 1.0 | 1.1 |
| Example 78 | 0 | 0 | 0 | 0.1 | 0.1 | 0.2 | 0.2 | 0.3 | 0.5 | 0.6 |
| Example 79 | 0 | 0 | 0 | 0.1 | 0.1 | 0.2 | 0.3 | 0.3 | 0.6 | 0.7 |
| Example 80 | 0 | 0 | 0.1 | 0.2 | 0.3 | 0.4 | 0.5 | 0.7 | 0.8 | 0.9 |
| Example 81 | 0 | 0 | 0.1 | 0.2 | 0.3 | 0.5 | 0.6 | 0.7 | 0.9 | 1.0 |
| Example 82 | 0 | 0.1 | 0.2 | 0.3 | 0.4 | 0.6 | 0.8 | 0.8 | 1.0 | 1.2 |
| Example 83 | 0 | 0.1 | 0.2 | 0.3 | 0.4 | 0.6 | 0.8 | 0.9 | 1.0 | 1.2 |
| Example 84 | 0 | 0 | 0 | 0.1 | 0.1 | 0.1 | 0.2 | 0.3 | 0.4 | 0.6 |
| Example 85 | 0 | 0.1 | 0.2 | 0.4 | 0.6 | 0.7 | 0.9 | 1.0 | 1.1 | 1.3 |
| Example 86 | 0 | 0.2 | 0.4 | 0.5 | 0.7 | 0.8 | 1.0 | 1.1 | 1.3 | 1.5 |
| Example 87 | 0 | 0 | 0 | 0.1 | 0.1 | 0.2 | 0.3 | 0.4 | 0.5 | 0.7 |
| Comparative Example 1 | 0.2 | 0.5 | 0.9 | 1.3 | 1.5 | 2.0 | 2.8 | 3.1 | 4.4 | 5.9 |
| Comparative Example 2 | 0.5 | 0.8 | 1.3 | 2.0 | 2.8 | 3.6 | 4.8 | 6.0 | 7.5 | 8.8 |
| Comparative Example 3 | 0.4 | 0.8 | 1.2 | 1.8 | 2.6 | 3.5 | 4.5 | 5.8 | 7.1 | 8.6 |
| Comparative Example 4 | 0.6 | 1.2 | 1.8 | 2.5 | 3.7 | 5 | 5.8 | 7.6 | 8.8 | 9.7 |
| Comparative Example 5 | 0.3 | 0.7 | 1 | 1.3 | 2.0 | 2.8 | 3.9 | 4.9 | 6.2 | 7.4 |
| Comparative Example 6 | 0.3 | 0.6 | 0.9 | 1.2 | 1.9 | 2.5 | 3.8 | 4.6 | 5.5 | 6.9 |
| Comparative Example 7 | 0.2 | 0.4 | 0.6 | 0.9 | 1.1 | 1.4 | 1.8 | 2.2 | 2.4 | 2.7 |
| Comparative Example 8 | 0.2 | 0.6 | 1.0 | 1.4 | 1.6 | 2.2 | 3.0 | 3.3 | 4.6 | 6.2 |
| Comparative Example 9 | 0.7 | 1.0 | 1.5 | 2.4 | 3.3 | 3.9 | 5.4 | 6.6 | 7.9 | 9.2 |
| Comparative Example 10 | 0.6 | 0.9 | 1.3 | 1.9 | 2.8 | 3.7 | 4.7 | 6.0 | 7.3 | 8.9 |
| Comparative Example 11 | 0.7 | 1.3 | 1.9 | 2.7 | 3.9 | 5.2 | 6.1 | 7.9 | 9.0 | 9.9 |
| Comparative Example 12 | 0.4 | 0.8 | 1.1 | 1.4 | 2.5 | 2.9 | 4.0 | 5.2 | 6.3 | 7.6 |
| Comparative Example 13 | 0.4 | 0.7 | 1.0 | 1.3 | 2.0 | 2.6 | 3.9 | 4.8 | 5.6 | 7.0 |

It can be seen from Table 3 that the thermal conductive compositions of the present disclosure have a fast heat conduction rate and good heat dissipation efficiency.

In particular, when the surfactant is an anionic surfactant, it can be seen from the comparison between Example 53 and Example 61 that when the phase change material is polyethylene wax and the metal thermal conductive material is copper, it is beneficial to obtain better heat absorption rate and heat transfer effect. It can be seen from the comparison between Example 53 and Example 67 that when the first filler is a capsule formed by wrapping the phase change material with the metal thermal conductive material, it is beneficial to obtain a better heat absorption rate and heat transfer effect.

When the surfactant is a nonionic surfactant, it can be seen from the comparison between Example 71 and Example 78 that when the phase change material is polyethylene wax and the metal thermal conductive material is copper, it is beneficial to obtain better heat absorption rate and heat transfer effect. It can be seen from the comparison between Example 71 and Example 84 that when the first filler is a capsule formed by wrapping the phase change material with the metal thermal conductive material, it is beneficial to obtain a better heat absorption rate and heat transfer effect.

Examples 88-105 illustrate the thermal conductive composition provided by the present disclosure.

Example 88

In the thermal conductive silicone grease composition of this example, the silicone oil is dimethyl silicone oil (viscosity at 25° C L: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 m²/g) and the modified graphene prepared in Example 30, and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present example.

Examples 89-95

The thermal conductive composition was prepared according to the method of Example 88, except that the modified graphene prepared in Examples 32, 34, 36, 39, 40, 41, and 43 were respectively used.

Example 96

In the thermal conductive composition of this example, the silicone oil is vinyl silicone oil (viscosity at 25° CL: 400,000 cSt); the first filler consists of copper and polyethylene wax (phase transition temperature: 56-60° C.) and the weight ratio between copper and polyethylene wax is 1:1.8; the second filler consists of carbon nanotubes (purity≥95% by weight, ash content≤0.2% by weight, and specific surface area: 100-200 m²/g) and the modified graphene prepared in Example 30, and the weight ratio between carbon nanotubes and the modified graphene is 1:15.

100 parts by weight of silicone oil, 24 parts by weight of the first filler, and 108 parts by weight of the second filler were mixed and stirred for 30 minutes, and then placed in a counter-roll mill for grinding for 1 hour to obtain the thermal conductive composition of the present example.

Example 97

In the thermal conductive composition of this example, the silicone oil is hydroxy silicone oil (viscosity at 25° CL: 250,000 cSt); the first filler consists of zinc oxide and polyethylene glycol (molecular weight: 6,000, phase transition temperature: 60-65° C.) and the weight ratio between zinc oxide and polyethylene glycol is 1:1.5; the second filler consists of carbon nanotubes (purity≥95% by weight, ash content≤0.2% by weight, and specific surface area: 100-200 m²/g) and the modified graphene prepared in Example 30, and the weight ratio between carbon nanotubes and the modified graphene is 1:6.

100 parts by weight of silicone oil, 35 parts by weight of the first filler, and 96 parts by weight of the second filler were mixed and stirred for 30 minutes, and then placed in a counter-roll mill for grinding for 1 hour to obtain the thermal conductive composition of the present example.

Example 98

The components of the thermal conductive composition of this example are the same as those of Example 88.

100 parts by weight of silicone oil, 40 parts by weight of the first filler, and 80 parts by weight of the second filler were mixed and stirred for 30 minutes, and then placed in a counter-roll mill for grinding for 1 hour to obtain the thermal conductive composition of the present example.

Example 99

The components of the thermal conductive composition of this example are the same as those of Example 88.

100 parts by weight of silicone oil, 20 parts by weight of the first filler, and 120 parts by weight of the second filler were mixed and stirred for 30 minutes, and then placed in a counter-roll mill for grinding for 1 hour to obtain the thermal conductive composition of the present example.

Example 100

The components of the thermal conductive composition of this example are the same as those of Example 88.

100 parts by weight of silicone oil, 10 parts by weight of the first filler, and 130 parts by weight of the second filler were mixed and stirred for 30 minutes, and then placed in a counter-roll mill for grinding for 1 hour to obtain the thermal conductive composition of the present example.

Example 101

The components of the thermal conductive composition of this example are the same as those of Example 88.

100 parts by weight of silicone oil, 50 parts by weight of the first filler, and 60 parts by weight of the second filler were mixed and stirred for 30 minutes, and then placed in a counter-roll mill for grinding for 1 hour to obtain the thermal conductive composition of the present example.

Example 102

The difference between the thermal conductive composition of this example and that of Example 88 is that the first filler is a capsule with a particle size of 50-80 nm formed by wrapping polyethylene glycol with zinc oxide.

Example 103

The difference between the thermal conductive composition of this example and that of Example 88 is that the first filler consists of alumina and liquid paraffin (phase transition temperature: 55-58° C.) and the weight ratio between alumina and liquid paraffin is 1:1.2.

Example 104

The difference between the thermal conductive composition of this example and that of Example 88 is that the first filler consists of silver and urea (phase transition temperature: 50-56° C.) and the weight ratio between silver and urea is 1:1.8.

Example 105

In the thermal conductive silicone grease of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1; the second filler consists of carbon nanotubes (purity≥95% by weight, ash content≤0.2% by weight, and specific surface area: 100-200 m²/g) and the modified graphene prepared in Example 30, and the weight ratio between carbon nanotubes and the modified graphene is 1:10; the auxiliary agent consists of N,N'-diaryl-p-phenylenediamine and mineral oil and the weight ratio between N,N'-diaryl-p-phenylenediamine and mineral oil is 1:0.5.

100 parts by weight of silicone oil, 30 parts by weight of the first filler, 100 parts by weight of the second filler, and 2 parts by weight of the auxiliary agent were mixed and stirred for 30 minutes, and then placed in a counter-roll mill for grinding for 1 hour to obtain the thermal conductive composition of the present example.

Comparative Examples 14-19 illustrate thermal conductive compositions different from those of the present disclosure.

Comparative Example 14

The components of the thermal conductive composition of this comparative example is the same as those of Example 88, except that 100 parts by weight of silicone oil, 65 parts by weight of the first filler, and 45 parts by weight of the second filler were mixed and stirred for 30 minutes, and then placed in a counter-roll mill for grinding for 1 hour to obtain the thermal conductive composition of the present example.

Comparative Example 15

The components of the thermal conductive composition of this comparative example is the same as those of Example 88, except that 100 parts by weight of silicone oil, 5 parts by weight of the first filler, and 155 parts by weight of the second filler were mixed and stirred for 30 minutes, and then placed in a counter-roll mill for grinding for 1 hour to obtain the thermal conductive composition of the present example.

Comparative Example 16

In the thermal conductive composition of this comparative example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:0.1; the second filler consists of carbon nanotubes (purity≥95% by weight, ash content≤0.2% by weight, and specific surface area: 100-200 m$^2$/g) and the modified graphene prepared in Example 30 and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 17

In the thermal conductive composition of this comparative example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 m$^2$/g) and the modified graphene prepared in Example 30, and the weight ratio between carbon nanotubes and the modified graphene is 1:0.5.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present comparative example.

Comparative Example 18

The difference between the thermal conductive composition of this comparative example and that of Example 88 is that the first filler consists of zinc oxide only.

Comparative Example 19

The difference between the thermal conductive composition of this comparative example and that of Example 88 is that the second filler consists of modified graphene only.

Test Example 4

The thermal conductivity, thermal resistance and electrical conductivity of the modified graphene prepared in Examples 88-105 and Comparative Examples 14-19 were tested, wherein the thermal conductivity and thermal resistance were tested according to ASTM D5470 and the electrical conductivity was tested according to Q/JSGL 006-2014. The test results are listed in Table 4.

TABLE 4

| Example | Thermal conductivity, W/m · K | Thermal resistance, K · m$^2$/W | Electrical conductivity, S/m |
| --- | --- | --- | --- |
| Example 88 | 6.78 | 0.0000071 | 204 |
| Example 89 | 6.54 | 0.0000076 | 182 |
| Example 90 | 7.11 | 0.0000062 | 169 |
| Example 91 | 6.36 | 0.000008 | 211 |
| Example 92 | 6.32 | 0.0000083 | 215 |
| Example 93 | 6.25 | 0.0000085 | 222 |
| Example 94 | 6.18 | 0.0000087 | 230 |
| Example 95 | 6.14 | 0.0000089 | 233 |
| Example 96 | 6.92 | 0.0000067 | 195 |
| Example 97 | 6.85 | 0.0000069 | 198 |
| Example 98 | 6.33 | 0.0000083 | 214 |
| Example 99 | 6.21 | 0.0000086 | 235 |
| Example 100 | 6.13 | 0.000009 | 232 |
| Example 101 | 6.09 | 0.0000092 | 239 |
| Example 102 | 6.86 | 0.0000068 | 197 |
| Example 103 | 6.16 | 0.0000088 | 231 |
| Example 104 | 6.10 | 0.0000091 | 238 |
| Example 105 | 6.81 | 0.000007 | 199 |
| Comparative Example 14 | 3.83 | 0.000019 | 273 |
| Comparative Example 15 | 2.54 | 0.000051 | 280 |
| Comparative Example 16 | 2.66 | 0.000046 | 275 |
| Comparative Example 17 | 1.49 | 0.000077 | 294 |
| Comparative Example 18 | 2.67 | 0.000038 | 332 |
| Comparative Example 19 | 2.87 | 0.000034 | 268 |

It can be seen from Table 4 that the thermal conductive composition of the present disclosure has a higher thermal conductivity, a lower thermal resistance and a lower electrical conductivity.

Test Example 5

The effects of the thermally conductive compositions of Examples 88-105 and Comparative Examples 14-19 in CPU heat dissipation uses were tested. Test object: a 30 W CPU chip equipped with a 25 W heat sink. The thermal conductive compositions of Examples 88-105 and Comparative Examples 14-19 were respectively coated between the CPU chip and the heat sink with a thickness of 0.06 mm, the power was turned on, and then at the room temperature (20° C.), the temperature of the CPU chip and the heat sink was tested every two minutes within 20 minutes of applying the thermal conductive composition, and the temperature difference was calculated. The test results are listed in Table 5.

TABLE 5

| Example | Temperature difference, ° C. | | | | | | | | | |
|---|---|---|---|---|---|---|---|---|---|---|
| | 2 min | 4 min | 6 min | 8 min | 10 min | 12 min | 14 min | 16 min | 18 min | 20 min |
| Example 88 | 0 | 0 | 0 | 0 | 0.1 | 0.1 | 0.1 | 0.2 | 0.4 | 0.5 |
| Example 89 | 0 | 0 | 0 | 0 | 0.1 | 0.1 | 0.2 | 0.3 | 0.4 | 0.5 |
| Example 90 | 0 | 0 | 0 | 0 | 0.1 | 0.1 | 0.1 | 0.2 | 0.3 | 0.4 |
| Example 91 | 0 | 0 | 0 | 0.1 | 0.1 | 0.2 | 0.2 | 0.3 | 0.4 | 0.6 |
| Example 92 | 0 | 0 | 0 | 0.1 | 0.2 | 0.2 | 0.3 | 0.4 | 0.5 | 0.6 |
| Example 93 | 0 | 0 | 0 | 0.1 | 0.2 | 0.3 | 0.4 | 0.5 | 0.6 | 0.7 |
| Example 94 | 0 | 0 | 0.1 | 0.2 | 0.3 | 0.4 | 0.5 | 0.6 | 0.7 | 0.8 |
| Example 95 | 0 | 0 | 0.1 | 0.2 | 0.3 | 0.4 | 0.5 | 0.7 | 0.8 | 0.9 |
| Example 96 | 0 | 0 | 0 | 0 | 0.1 | 0.1 | 0.1 | 0.2 | 0.3 | 0.4 |
| Example 97 | 0 | 0 | 0 | 0 | 0.1 | 0.1 | 0.1 | 0.2 | 0.3 | 0.5 |
| Example 98 | 0 | 0 | 0 | 0.1 | 0.2 | 0.3 | 0.3 | 0.4 | 0.5 | 0.7 |
| Example 99 | 0 | 0 | 0 | 0.1 | 0.2 | 0.3 | 0.4 | 0.4 | 0.5 | 0.7 |
| Example 100 | 0 | 0 | 0.1 | 0.2 | 0.3 | 0.4 | 0.5 | 0.7 | 0.9 | 1.0 |
| Example 101 | 0 | 0 | 0.1 | 0.2 | 0.4 | 0.5 | 0.6 | 0.7 | 0.9 | 1.0 |
| Example 102 | 0 | 0 | 0 | 0 | 0.1 | 0.1 | 0.1 | 0.2 | 0.3 | 0.4 |
| Example 103 | 0 | 0 | 0.1 | 0.2 | 0.3 | 0.4 | 0.5 | 0.6 | 0.8 | 1.0 |
| Example 104 | 0 | 0 | 0.1 | 0.2 | 0.3 | 0.4 | 0.6 | 0.7 | 0.9 | 1.1 |
| Example 105 | 0 | 0 | 0 | 0 | 0.1 | 0.1 | 0.1 | 0.2 | 0.3 | 0.5 |
| Comparative Example 14 | 0.2 | 0.5 | 0.9 | 1.3 | 1.5 | 2.0 | 2.8 | 3.1 | 4.4 | 5.9 |
| Comparative Example 15 | 0.5 | 0.8 | 1.3 | 2.0 | 2.8 | 3.6 | 4.8 | 6.0 | 7.5 | 8.8 |
| Comparative Example 16 | 0.4 | 0.8 | 1.2 | 1.8 | 2.6 | 3.5 | 4.5 | 5.8 | 7.1 | 8.6 |
| Comparative Example 17 | 0.6 | 1.2 | 1.8 | 2.5 | 3.7 | 5 | 5.8 | 7.6 | 8.8 | 9.7 |
| Comparative Example 18 | 0.3 | 0.7 | 1 | 1.3 | 2.0 | 2.8 | 3.9 | 4.9 | 6.2 | 7.4 |
| Comparative Example 19 | 0.3 | 0.6 | 0.9 | 1.2 | 1.9 | 2.5 | 3.8 | 4.6 | 5.5 | 6.9 |

It can be seen from Table 5 that the thermal conductive composition of the present disclosure has a fast heat conduction rate and good heat dissipation efficiency. In particular, it can be seen from the comparison between Example 88 and Example 96 that when the phase change material is polyethylene wax and the metal thermal conductive material is copper, it is beneficial to obtain better heat absorption rate and heat transfer effect. It can be seen from the comparison between Example 88 and Example 102 that when the first filler is a capsule formed by wrapping the phase change material with the metal thermal conductive material, it is beneficial to obtain a better heat absorption rate and heat transfer effect.

Examples 106-112 illustrate the thermal conductive composition provided by the present disclosure.

Example 106

In the thermal conductive composition of this example, the silicone oil is dimethyl silicone oil (viscosity at 25° CL: 450,000 cSt); the first filler consists of zinc oxide and polyethylene glycol (molecular weight: 6,000, phase transition temperature: 60-65° C.) and the weight ratio between zinc oxide and polyethylene glycol is 1:1.2; the second filler consists of carbon nanotubes (purity≥95% by weight, ash content≤0.2% by weight, and specific surface area: 100-200 m$^2$/g) and the modified graphene prepared in Example 46, and the weight ratio between carbon nanotubes and the modified graphene is 1:10.

100 parts by weight of silicone oil, 30 parts by weight of the first filler, and 100 parts by weight of the second filler were mixed and stirred for 30 minutes, and then placed in a counter-roll mill for grinding for 1 hour to obtain the thermal conductive composition of the present example.

Examples 107-112

The thermal conductive composition was prepared according to the method of Example 106, except that the modified graphene prepared in Examples 47-52 were respectively used.

Test Example 6

The thermal conductivity and thermal resistance of the thermal conductive compositions prepared in Examples 106-112 were tested according to ASTM D5470. The test results are listed in Table 6.

TABLE 6

| Example | Thermal conductivity, W/m · K | Thermal resistance, K · m$^2$/W |
|---|---|---|
| Example 106 | 7.58 | 0.0000063 |
| Example 107 | 7.62 | 0.0000060 |
| Example 108 | 7.34 | 0.0000066 |
| Example 109 | 7.26 | 0.0000070 |
| Example 110 | 7.20 | 0.0000074 |
| Example 111 | 7.27 | 0.0000069 |
| Example 112 | 7.22 | 0.0000073 |

Test Example 7

The effects of the thermal conductive compositions of Examples 106-112 in LED heat dissipation uses were tested.

Test object: a 30 W LED chip equipped with a 25 W sunflower heat sink. The thermal conductive compositions of Examples 106-112 were respectively coated between the LED chip and the fins with a thickness of 0.06 mm, the power was turned on, and then at the room temperature (20° C.), the temperatures of the LED chip and the fins were tested every two minutes within 20 minutes of applying the thermal conductive composition, and the temperature difference was calculated. The test results are listed in Table 7.

TABLE 7

| Example | Temperature difference, ° C. | | | | | | | | | |
|---|---|---|---|---|---|---|---|---|---|---|
| | 2 min | 4 min | 6 min | 8 min | 10 min | 12 min | 14 min | 16 min | 18 min | 20 min |
| Example 106 | 0 | 0 | 0 | 0.1 | 0.1 | 0.1 | 0.2 | 0.3 | 0.4 | 0.6 |
| Example 107 | 0 | 0 | 0 | 0.1 | 0.1 | 0.2 | 0.2 | 0.3 | 0.5 | 0.7 |
| Example 108 | 0 | 0 | 0.1 | 0.1 | 0.2 | 0.2 | 0.3 | 0.4 | 0.5 | 0.6 |
| Example 109 | 0 | 0 | 0.1 | 0.2 | 0.2 | 0.3 | 0.4 | 0.5 | 0.6 | 0.7 |
| Example 110 | 0 | 0 | 0.1 | 0.2 | 0.2 | 0.3 | 0.4 | 0.5 | 0.6 | 0.7 |
| Example 111 | 0 | 0 | 0.1 | 0.2 | 0.2 | 0.3 | 0.4 | 0.6 | 0.6 | 0.8 |
| Example 112 | 0 | 0 | 0.1 | 0.2 | 0.3 | 0.3 | 0.5 | 0.6 | 0.7 | 0.8 |

It can be seen from Table 7 that the thermal conductive composition of the present disclosure has a fast heat conduction rate and good heat dissipation efficiency.

Examples 113-139 illustrate the graphene heat dissipation composition provided by the present disclosure.

Example 113

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and polyvinylidene fluoride is 1:4), 15 parts by weight of the modified graphene prepared in Example 1, 6 parts by weight of carbon nanotubes (purity≥95% by weight, ash content≤0.2% by weight, specific surface area: 100-200 m$^2$/g), 5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Examples 114-120

The graphene heat dissipation composition was prepared according to the method of Example 113, except that the modified graphene prepared in Examples 3, 5, 7, 9, 10, 11, and 12 were respectively used.

Example 121

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 18 parts by weight of the modified graphene prepared in Example 1, 4 parts by weight of carbon nanotubes (purity≥95% by weight, ash content≤0.2% by weight, specific surface area: 100-200 m$^2$/g), 2 parts by weight of copper (particle size: 20-50 μm), 60 parts by weight of diluent ethyl acetate, 10 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 122

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 20 parts by weight of the modified graphene prepared in Example 1, 8 parts by weight of carbon nanotubes (purity≥95% by weight, ash content≤0.2% by weight, specific surface area: 100-200 m$^2$/g), 1 part by weight of silver (particle size: 20-50 μm), 40 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 123

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 10 parts by weight of the modified graphene prepared in Example 1, 12 parts by weight of carbon nanotubes (purity≥95% by weight, ash content≤0.2% by weight, specific surface area: 100-200 m$^2$/g), 8 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 124

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 5 parts by weight of the modified graphene prepared in Example 1, 5 parts by weight of carbon nanotubes (purity≥95% by weight, ash content≤0.2% by weight, specific surface area: 100-200 m$^2$/g), 0.5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 125

The difference between the graphene heat dissipation composition of this example and that of Example 113 is that the fluoropolymer consists of polytetrafluoroethylene only.

Example 126

The difference between the graphene heat dissipation composition of this example and that of Example 113 is that the fluoropolymer consists of polychlorotrifluoroethylene (weight-average molecular weight: 50,000) and polyvinylidene fluoride (weight-average molecular weight: 10,000), and the weight ratio between polychlorotrifluoroethylene and the polyvinylidene fluoride is weight ratio of 1:4.

Example 127

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 15 parts by weight of the modified graphene prepared in Example 15, 6 parts by weight of carbon nanotubes (purity≥95% by weight, ash content≤0.2% by weight, specific surface area: 100-200 m$^2$/g), 5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Examples 128-133

The graphene heat dissipation composition was prepared according to the method of Example 127, except that the modified graphene prepared in Examples 17, 19, 24, 25, 26, and 27 were respectively used.

Example 134

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 18 parts by weight of the modified graphene prepared in Example 15, 4 parts by weight of carbon nanotubes (purity≥95% by weight, ash content≤0.2% by weight, specific surface area: 100-200 m$^2$/g), 2 parts by weight of copper (particle size: 20-50 μm), 60 parts by weight of diluent ethyl acetate, 10 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 135

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 20 parts by weight of the modified graphene prepared in Example 15, 8 parts by weight of carbon nanotubes (purity≥95% by weight, ash content≤0.2% by weight, specific surface area: 100-200 m$^2$/g), 1 part by weight of silver (particle size: 20-50 μm), 40 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 136

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 10 parts by weight of the modified graphene prepared in Example 15, 12 parts by weight of carbon nanotubes (purity≥95% by weight, ash content≤0.2% by weight, specific surface area: 100-200 m$^2$/g), 8 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 137

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 5 parts by weight of the modified graphene prepared in Example 15, 5 parts by weight of carbon nanotubes (purity≥95% by weight, ash content≤0.2% by weight, specific surface area: 100-200 m$^2$/g), 0.5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 138

The difference between the graphene heat dissipation composition of this example and that of Example 127 is that the fluoropolymer consists of polytetrafluoroethylene only.

Example 139

The difference between the graphene heat dissipation composition of this example and that of Example 127 is that the fluoropolymer consists of polychlorotrifluoroethylene (weight-average molecular weight: 50,000) and polyvinylidene fluoride (weight-average molecular weight: 10,000), and the weight ratio between polychlorotrifluoroethylene and the polyvinylidene fluoride is 1:4.

Comparative Examples 20-24 illustrate the graphene heat dissipation composition different from the present disclosure.

Comparative Example 20

The components and ratio thereof of the composition of this comparative example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 30 parts by weight of the modified graphene prepared in Example 1, 16 parts by weight of carbon nanotubes (purity≥95% by weight, ash content≤0.2% by weight, specific surface area: 100-200 m$^2$/g), 10 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Comparative Example 21

The components and ratio thereof of the composition of this comparative example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 2 parts by weight of the modified graphene prepared in Example 1, 2 parts by weight of carbon nanotubes (purity≥95% by weight, ash content≤0.2% by weight, specific surface area: 100-200 m$^2$/g), 0.05 parts by weight of zinc oxide (particle size: 20-50 μm), 80 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Comparative Example 22

The difference between the thermal conductive composition of this comparative example and that of Example 113 is that the graphene oxide was not modified, that is, the same amount of graphene oxide was used to replace the modified graphene in Example 113.

Comparative Example 23

The components and ratio thereof of the composition of this comparative example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 30 parts by weight of the modified graphene prepared in Example 15, 16 parts by weight of carbon nanotubes (purity≥95% by weight, ash content≤0.2% by weight, specific surface area: 100-200 m$^2$/g), 10 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Comparative Example 24

The components and ratio thereof of the composition of this comparative example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and the polyvinylidene fluoride is 1:4), 2 parts by weight of the modified graphene prepared in Example 15, 2 parts by weight of carbon nanotubes (purity≥95% by weight, ash content≤0.2% by weight, specific surface area: 100-200 m$^2$/g), 0.05 parts by weight of zinc oxide (particle size: 20-50 μm), 80 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Test Example 8

The thermal conductivity and electrical conductivity of the graphene heat dissipation compositions of Examples 113-139 and Comparative Examples 20-24 were tested. The thermal conductivity was tested according to GB/T22588-2008, and the electrical conductivity was tested according to Q/JSGL 006-2014. The test results are listed in Table 8.

TABLE 8

| Example | Thermal conductivity, W/(m · K) | Electrical conductivity, S/m |
| --- | --- | --- |
| Example 113 | 8.22 | 153 |
| Example 114 | 8.10 | 148 |
| Example 115 | 8.34 | 141 |
| Example 116 | 7.80 | 164 |
| Example 117 | 7.74 | 167 |
| Example 118 | 7.70 | 172 |
| Example 119 | 7.52 | 178 |
| Example 120 | 7.50 | 181 |
| Example 121 | 8.33 | 143 |
| Example 122 | 8.08 | 156 |
| Example 123 | 7.44 | 200 |
| Example 124 | 7.33 | 207 |
| Example 125 | 7.62 | 176 |
| Example 126 | 7.60 | 178 |
| Example 127 | 8.11 | 166 |
| Example 128 | 7.98 | 157 |
| Example 129 | 7.68 | 177 |
| Example 130 | 7.62 | 181 |
| Example 131 | 7.57 | 185 |
| Example 132 | 7.40 | 191 |
| Example 133 | 7.38 | 195 |
| Example 134 | 8.21 | 158 |
| Example 135 | 7.96 | 160 |
| Example 136 | 7.31 | 213 |
| Example 137 | 7.20 | 220 |
| Example 138 | 7.41 | 189 |
| Example 139 | 7.36 | 196 |
| Comparative Example 20 | 4.30 | 291 |
| Comparative Example 21 | 4.23 | 284 |
| Comparative Example 22 | 3.82 | 355 |
| Comparative Example 23 | 4.16 | 308 |
| Comparative Example 24 | 4.11 | 315 |

It can be seen from Table 8 that the graphene heat dissipation composition of the present disclosure has a higher thermal conductivity and a lower electrical conductivity.

In the embodiment where the surfactant is an anionic surfactant, it can be seen from the comparison among Examples 113-120 that when, in the modified graphene, the weight ratio among the graphene oxide, silicate ester, inorganic alkali solution, water-soluble polymer compound and anionic surfactant is 1:(1.8-2.8):(0.6-1):(0.3-0.6):(0.1-0.25), or the weight ratio between the tetramethyl orthosilicate and trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the thermal conductivity of the graphene heat dissipation composition and reduce its electrical conductivity. It can be seen from the comparison between Examples 113-122 and Examples 123-124 that when the value of R calculated according to the formula R=2.376 w(modified graphene)+0.828 w(carbon nanotube)−1.755 w(metal thermal conductive material)+0.064 (additive) is 32.5-65.5, it is beneficial to further improve the thermal conductivity of the graphene heat dissipation composition and reduce its electrical conductivity. It can be seen from the comparison between Example 113 and Examples 125-126 that when the fluoropolymer consists of polytetrafluoroethylene and polyvinylidene fluoride and the weight ratio of polytetrafluoroethylene to the polyvinylidene fluoride is 1:(2-6), it is beneficial to further improve the thermal conductivity of the graphene heat dissipation composition and reduce its electrical conductivity.

In the embodiment where the surfactant is a nonionic surfactant, it can be seen from the comparison between Examples 127-133 that when, in the modified graphene, the weight ratio of the graphene oxide, silicate ester, inorganic alkali solution, water-soluble polymer compound and nonionic surfactant is 1:(1.8-2.8):(0.6-1):(0.08-0.25):(0.3-0.6), or the weight ratio of the tetramethyl orthosilicate and trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the thermal conductivity of the graphene heat dissipation composition and reduce its electrical conductivity. It can be seen from the comparison between Examples 127-134 and Examples 136-137 that when the value of R calculated according to the formula R=2.376 w(modified graphene)+0.828 w(carbon nanotube)−1.755 w(metal thermal conductive material)+0.064 (additive) is 32.5-65.5, it is beneficial to further improve the thermal conductivity of the graphene heat dissipation composition and reduce its electrical conductivity. It can be seen from the comparison between Example 127 and Examples 138-139 that when the fluoropolymer is polytetrafluoroethylene and polyvinylidene fluoride and the weight ratio of polytetrafluoroethylene to the polyvinylidene fluoride is 1:(2-6), it is beneficial to further improve the thermal conductivity of the graphene heat dissipation composition and reduce its electrical conductivity.

Test Example 9

The heat dissipation effects of the graphene heat dissipation compositions of Examples 113-139 and Comparative Examples 20-24 were tested.

The aluminum alloy heat sink with a size of 20 cm×10 cm×2 cm was subjected to surface cleaning treatment. The compositions of Examples 113-139 and Comparative Examples 20-24 were fully stirred and then poured into the spray gun. The spray gun pressure was set to 0.4 MPa. The heat sink was sprayed twice at desired locations thereof by a spacing of 20 cm, so that the surface of the heat sink was evenly coated with the composition, and then dried and cured naturally for 12 hours.

The heat sink obtained was connected to the CPU chip with a power of 30 W, then chip was turned on and the initial temperature of the chip was recorded, then the temperature of the CPU chip and the heat sink after 1 hour at room temperature (20° C.) was recorded. The test results are listed in Table 9.

TABLE 9

| Example | Initial temperature of CPU chip, °C. | Temperature of CPU chip after 1 hour of operation, °C. |
|---|---|---|
| Example 113 | 25 | 36.0 |
| Example 114 | 25 | 36.2 |
| Example 115 | 25 | 35.8 |
| Example 116 | 25 | 36.5 |
| Example 117 | 25 | 36.6 |
| Example 118 | 25 | 36.9 |
| Example 119 | 25 | 37.3 |
| Example 120 | 25 | 37.5 |
| Example 121 | 25 | 35.8 |
| Example 122 | 25 | 36.3 |
| Example 123 | 25 | 38.7 |
| Example 124 | 25 | 39.0 |
| Example 125 | 25 | 37.3 |
| Example 126 | 25 | 37.5 |
| Example 127 | 25 | 36.1 |
| Example 128 | 25 | 36.3 |
| Example 129 | 25 | 36.6 |
| Example 130 | 25 | 36.7 |
| Example 131 | 25 | 37.0 |
| Example 132 | 25 | 37.4 |
| Example 133 | 25 | 37.6 |
| Example 134 | 25 | 36.0 |
| Example 135 | 25 | 36.4 |
| Example 136 | 25 | 38.8 |
| Example 137 | 25 | 39.2 |
| Example 138 | 25 | 37.9 |
| Example 139 | 25 | 38.2 |
| Comparative Example 20 | 25 | 57.2 |
| Comparative Example 21 | 25 | 60.0 |
| Comparative Example 22 | 25 | 62.2 |
| Comparative Example 23 | 25 | 58.1 |
| Comparative Example 24 | 25 | 61.3 |

It can be seen from Table 9 that the graphene heat dissipation composition of the present disclosure has a fast heat conduction rate and good heat dissipation efficiency.

Specifically, in the embodiments where the surfactant is an anionic surfactant, the difference between the initial temperature and the final temperature after 1 hour of operation of the CPU chip of Comparative Examples 20-22 is 32.2-37.6° C., while difference between the initial temperature and the final temperature after 1 hour of operation of the CPU chip of Examples 113-126 is only 10.8-14.0° C., which proves that the graphene heat dissipation composition of the present disclosure has better heat dissipation effects.

In the embodiments where the surfactant is a nonionic surfactant, the difference between the initial temperature and the final temperature after 1 hour of operation of the CPU chip of Comparative Examples 23-24 is 33.1-38.6° C., while difference between the initial temperature and the final temperature after 1 hour of operation of the CPU chip of Examples 127-139 is only 11.0-14.2° C., which proves that the graphene heat dissipation composition of the present disclosure has better heat dissipation effects.

Examples 140-153 illustrate the graphene heat dissipation composition provided by the present disclosure.

Example 140

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio of polytetrafluoroethylene to the polyvinylidene fluoride is 1:4), 15 parts by weight of the modified graphene prepared in Example 30, 6 parts by weight of carbon nanotubes (purity≥95% by weight, ash content≤0.2% by weight, specific surface area: 100-200 $m^2/g$), 5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Examples 141-147

The graphene heat dissipation composition was prepared according to the method of Example 140, except that the modified graphene prepared in Examples 32, 34, 36, 39, 40, 41, and 43 were respectively used.

Example 148

The components and ratio thereof of the graphene heat dissipation composition of this example were: 100 parts by weight of fluoropolymer (consisting of polytetrafluoroethylene with a weight-average molecular weight of 30,000 and polyvinylidene fluoride with a weight-average molecular weight of 10,000, and the weight ratio of polytetrafluoroethylene to the polyvinylidene fluoride is 1:4), 18 parts by weight of the modified graphene prepared in Example 30, 4 parts by weight of carbon nanotubes (purity≥95% by weight, ash content≤0.2% by weight, specific surface area: 100-200 $m^2/g$), 2 parts by weight of copper (particle size: 20-50 μm), 60 parts by weight of diluent ethyl acetate, 10 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 149

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 20 parts by weight of the modified graphene prepared in Example 30, 8 parts by weight of carbon nanotubes (purity≥95% by weight, ash content≤0.2% by weight, specific surface area: 100-200 $m^2/g$), 1 part by weight of silver (particle size: 20-50 μm), 40 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 150

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 10 parts by weight of the modified graphene prepared in Example 30, 12 parts by weight of carbon nanotubes (purity≥95% by weight, ash content≤0.2% by weight, specific surface area: 100-200 m$^2$/g), 8 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 151

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 5 parts by weight of the modified graphene prepared in Example 30, 5 parts by weight of carbon nanotubes (purity≥95% by weight, ash content≤0.2% by weight, specific surface area: 100-200 m$^2$/g), 0.5 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 152

The difference between the graphene heat dissipation composition of this example and that of Example 140 is that the fluoropolymer consists of polytetrafluoroethylene only.

Example 153

The difference between the graphene heat dissipation composition of this example and that of Example 140 is that the fluoropolymer consists of polychlorotrifluoroethylene (weight-average molecular weight: 50,000) and polyvinylidene fluoride (weight-average molecular weight: 10,000) and the weight ratio of polychlorotrifluoroethylene to the polyvinylidene fluoride is weight ratio of 1:4.

Comparative Examples 25-26 illustrate the graphene heat dissipation composition different from the present disclosure.

Comparative Example 25

The components and ratio thereof of the composition of this comparative example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 30 parts by weight of the modified graphene prepared in Example 30, 16 parts by weight of carbon nanotubes (purity≥95% by weight, ash content≤0.2% by weight, specific surface area: 100-200 m$^2$/g), 10 parts by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Comparative Example 26

The components and ratio thereof of the composition of this comparative example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 2 parts by weight of the modified graphene prepared in Example 30, 2 parts by weight of carbon nanotubes (purity≥95% by weight, ash content≤0.2% by weight, specific surface area: 100-200 m$^2$/g), 0.05 parts by weight of zinc oxide (particle size: 20-50 μm), 80 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Test Example 10

The thermal conductivity and electrical conductivity of the graphene heat dissipation compositions of Examples 140-153 and Comparative Examples 25-26 were tested. The thermal conductivity was tested according to GB/T22588-2008, and the electrical conductivity was tested according to Q/JSGL 006-2014. The test results are listed in Table 10.

TABLE 10

| Example | Thermal conductivity, W/(m · K) | Electrical conductivity, S/m |
| --- | --- | --- |
| Example 140 | 8.34 | 140 |
| Example 141 | 8.22 | 135 |
| Example 142 | 8.46 | 128 |
| Example 143 | 7.92 | 151 |
| Example 144 | 7.86 | 154 |
| Example 145 | 7.82 | 160 |
| Example 146 | 7.64 | 165 |
| Example 147 | 7.62 | 168 |
| Example 148 | 8.45 | 130 |
| Example 149 | 8.20 | 141 |
| Example 150 | 7.56 | 187 |
| Example 151 | 7.45 | 194 |
| Example 152 | 7.74 | 162 |
| Example 153 | 7.71 | 164 |
| Comparative Example 25 | 4.35 | 288 |
| Comparative Example 26 | 4.28 | 279 |

It can be seen from Table 10 that the graphene heat dissipation composition of the present disclosure has a higher thermal conductivity and a lower electrical conductivity. It can be seen from the comparison between Examples 140-147 that when, in the modified graphene, the weight ratio among the graphene oxide, silicate ester, inorganic alkali solution, water-soluble polymer compound and surfactant is 1:(1.8-2.8):(0.6-1):(0.2-0.6):(0.1-0.5), or the weight ratio between the tetramethyl orthosilicate and trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the thermal conductivity of the graphene heat dissipation composition and reduce its electrical conductivity. It can be seen from the comparison between Examples 140-149 and Examples 150-151 that when the value of R calculated according to the formula R=2.376 w(modified graphene)+0.828 w(carbon nanotube)−1.755 w(metal thermal conductive material)+0.064 (additive) is 32.5-65.5, it is beneficial to further improve the thermal conductivity of the graphene heat dissipation composition and reduce its electrical conductivity. It can be seen from the comparison between Example 140 and Examples 152-153 that when the fluoropolymer consists of polytetrafluoroethylene and polyvinylidene fluoride and the weight ratio of polytetrafluoroethylene to the polyvinylidene fluoride is 1:(2-6), it is beneficial to further improve the thermal conductivity of the graphene heat dissipation composition and reduce its electrical conductivity.

Test Example 11

The heat dissipation effects of the graphene heat dissipation compositions of Examples 140-153 and Comparative Examples 25-26 were tested.

The aluminum alloy heat sink with a size of 20 cm×10 cm×2 cm was subjected to surface cleaning treatment. The compositions of Examples 140-153 and Comparative Examples 25-26 were fully stirred and then poured into the spray gun. The spray gun pressure was set to 0.4 MPa. The heat sink was sprayed twice at desired locations thereof by a spacing of 20 cm, so that the surface of the heat sink was evenly coated with the composition, and then dried and cured naturally for 12 hours.

The heat sink obtained was connected to the CPU chip with a power of 30 W, then chip was turned on and the initial temperature of the chip was recorded, then the temperature of the CPU chip and the heat sink after 1 hour at room temperature (20° C.) was recorded. The test results are listed in Table 11.

TABLE 11

| Example | Initial temperature of CPU chip, ° C. | Temperature of CPU chip after 1 hour of operation, ° C. |
| --- | --- | --- |
| Example 140 | 25 | 35.8 |
| Example 141 | 25 | 36.0 |
| Example 142 | 25 | 35.6 |
| Example 143 | 25 | 36.3 |
| Example 144 | 25 | 36.4 |
| Example 145 | 25 | 36.7 |
| Example 146 | 25 | 37.1 |
| Example 147 | 25 | 37.3 |
| Example 148 | 25 | 35.6 |
| Example 149 | 25 | 36.1 |
| Example 150 | 25 | 38.5 |
| Example 151 | 25 | 38.8 |
| Example 152 | 25 | 37.1 |
| Example 153 | 25 | 37.4 |

TABLE 11-continued

| Example | Initial temperature of CPU chip, ° C. | Temperature of CPU chip after 1 hour of operation, ° C. |
| --- | --- | --- |
| Comparative Example 25 | 25 | 57.0 |
| Comparative Example 26 | 25 | 59.8 |

It can be seen from Table 11 that the graphene heat dissipation composition of the present disclosure has a fast heat conduction rate and good heat dissipation efficiency. Specifically, the difference between the initial temperature and the final temperature after 1 hour of operation of the CPU chip of Comparative Examples 25-26 is 32.0-34.8° C., while difference between the initial temperature and the final temperature after 1 hour of operation of the CPU chip of Examples 140-153 is only 10.6-13.8° C., which proves that the graphene heat dissipation composition of the present disclosure has better heat dissipation effects.

Examples 154-166 illustrate the graphene heat dissipation composition provided by the present disclosure.

Example 154

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio of polytetrafluoroethylene to the polyvinylidene fluoride is 1:4), 15 parts by weight of the modified graphene, 6 parts by weight of carbon nanotubes (purity≥95% by weight, ash content≤0.2% by weight, specific surface area: 100-200 m$^2$/g), 5 parts by weight of zinc oxide (particle size: 20-50 μm), 50 parts by weight of diluent ethyl acetate, 8 parts by weight of curing agent trimethylhexanediamine.

The preparation of the modified graphene is as follows: graphene oxide, tetramethyl orthosilicate, trimethylsiloxysilicate, sodium hydroxide solution (concentration: 30 g/L), polyacrylic acid (weight-average molecular weight: 5,000), cetyltrimethylammonium bromide and methyl acrylate were mixed according to the weight ratio of 1:1:0.2:2.5:0.2:0.1:0.06, reacted at 40° C. for 2 hours, then the solid product was collected and dried at 120° C. for 2 hours.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 155

The difference between the graphene heat dissipation composition of this example and that of Example 154 is that the modified graphene was prepared as follows: graphene oxide, tetramethyl orthosilicate, trimethylsiloxysilicate, sodium carbonate solution (concentration: 60 g/L), polyacrylic acid (weight average molecular weight: 5,000), cetyltrimethylammonium bromide and methyl acrylate were mixed according to the weight ratio of 1:0.5:0.5:1.3:0.1:0.2:0.04, reacted at 30° C. for 4 hours, then the solid product was collected and dried at 120° C. for 2 hours.

Example 156

The difference between the graphene heat dissipation composition of this example and that of Example 154 is that the modified graphene was prepared as follows: graphene oxide, tetramethyl orthosilicate, trimethylsiloxysilicate, sodium hydroxide solution (concentration: 30 g/L), polyacrylic acid (weight average molecular weight: 5,000), Tetradecyltrimethylammonium bromide and methyl acrylate were mixed according to the weight ratio of 1:1:0.2:2.5:0.2:0.1:0.06, stirred and reacted at 40° C. for 2 hours, then the solid product was collected and dried at 120° C. for 2 hours.

Example 157

The difference between the graphene heat dissipation composition of this example and that of Example 154 is that the modified graphene was prepared as follows: graphene oxide, tetramethyl orthosilicate, sodium hydroxide solution (concentration: 30 g/L), polyacrylic acid (weight-average molecular weight: 5,000), cetyltrimethylammonium bromide and methyl acrylate were mixed according to the weight ratio of 1:1.2:2.5:0.2:0.1:0.06, reacted at 40° C. for 2 hours, then the solid product was collected and dried at 120° C. for 2 hours.

Example 158

The difference between the graphene heat dissipation composition of this example and that of Example 154 is that the modified graphene was prepared as follows: graphene oxide, tetramethyl orthosilicate, trimethylsiloxysilicate, sodium hydroxide solution (concentration: 30 g/L), polymaleic anhydride (weight-average molecular weight: 10,000), cetyltrimethylammonium bromide and methyl acrylate were mixed according to the weight ratio of 1:1:0.2:2.5:0.2:0.1:0.06, reacted at 40° C. for 2 hours, then the solid product was collected and dried at 120° C. for 2 hours.

Example 159

The difference between the graphene heat dissipation composition of this example and that of Example 154 is that the modified graphene was prepared as follows: graphene oxide, tetramethyl orthosilicate, trimethylsiloxysilicate, sodium hydroxide solution (concentration: 30 g/L), polyacrylic acid (weight-average molecular weight: 5,000), cetyltrimethylammonium bromide and methyl acrylate were mixed according to the weight ratio of 1:1:1:0.2:0.5:0.5:0.05, reacted at 40° C. for 2 hours, then the solid product was collected and dried at 120° C. for 2 hours.

Example 160

The difference between the graphene heat dissipation composition of this example and that of Example 154 is that the modified graphene was prepared as follows: graphene oxide, tetramethyl orthosilicate, trimethylsiloxysilicate, sodium hydroxide solution (concentration: 30 g/L), polyacrylic acid (weight-average molecular weight: 5,000), cetyltrimethylammonium bromide and methyl acrylate were mixed according to the weight ratio of 1:0.3:0.2:6:0.05:0.02:0.01, reacted at 40° C. for 2 hours, then the solid product was collected and dried at 120° C. for 2 hours.

Example 161

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 18 parts by weight of the modified graphene (same as Example 54), 4 parts by weight of carbon nanotubes (purity≥95% by weight, ash content≤0.2% by weight, specific surface area: 100-200 m²/g), 2 parts by weight of copper (particle size: 20-50 μm), 60 parts by weight of diluent ethyl acetate, 10 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 162

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 20 parts by weight of the modified graphene (same as Example 54), 8 parts by weight of carbon nanotubes (purity≥95% by weight, ash content≤0.2% by weight, specific surface area: 100-200 m²/g), 1 part by weight of silver (particle size: 20-50 μm), 40 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 163

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 10 parts by weight of the modified graphene (same as Example 54), 12 parts by weight of carbon nanotubes (purity≥95% by weight, ash content≤0.2% by weight, specific surface area: 100-200 m²/g), 8 part by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 164

The components and ratio thereof of the graphene heat dissipation composition of this example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and the polyvinylidene fluoride is 1:4), 5 parts by weight of the modified graphene (same as Example 54), 5 parts by weight of carbon nanotubes (purity≥95% by weight, ash content≤0.2% by weight, specific surface area: 100-200 m²/g), 0.5 part by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Example 165

The difference between the graphene heat dissipation composition of this example and that of Example 154 is that the fluoropolymer consists of polytetrafluoroethylene only.

Example 166

The difference between the graphene heat dissipation composition of this example and that of Example 154 is that the fluoropolymer consists of polychlorotrifluoroethylene (weight-average molecular weight: 50,000) and polyvinylidene fluoride (weight-average molecular weight: 10,000) and the weight ratio between polychlorotrifluoroethylene and polyvinylidene fluoride is 1:4.

Comparative Examples 27-28 illustrate thermal conductive compositions different from those of the present disclosure.

Comparative Example 27

The components and ratio thereof of the composition of this comparative example were: 100 parts by weight of fluoropolymer (consisting of polytetrafluoroethylene with a weight-average molecular weight of 30,000 and polyvinylidene fluoride with a weight-average molecular weight of 10,000, and the weight ratio between polytetrafluoroethylene and polyvinylidene fluoride is 1:4), 30 parts by weight of the modified graphene (same as Example 154), 16 parts by weight of carbon nanotubes (purity≥95% by weight, ash content≤0.2% by weight, specific surface area: 100-200 m²/g), 10 part by weight of zinc oxide (particle size: 20-50 μm), 50 parts by weight of diluent ethyl acetate, 8 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Comparative Example 28

The components and ratio thereof of the composition of this comparative example were: 100 parts by weight of fluoropolymer (consisting of polytetrafluoroethylene with a weight average molecular weight of 30,000 and polyvinylidene fluoride with a weight average molecular weight of 10,000, and the weight ratio between polytetrafluoroethylene and polyvinylidene fluoride is 1:4), 2 parts by weight of the modified graphene (same as Example 154), 2 parts by weight of carbon nanotubes (purity≥95% by weight, ash content≤0.2% by weight, specific surface area: 100-200 m²/g), 0.05 part by weight of zinc oxide (particle size: 20-50 μm), 80 parts by weight of diluent ethyl acetate, 6 parts by weight of curing agent trimethylhexanediamine.

The fluoropolymer was mixed with the diluent, then modified graphene, carbon nanotubes, and zinc oxide were added and stirred at 1,000 rpm for 30 minutes, and finally the curing agent was added and mixed evenly to obtain the graphene heat dissipation composition of this example.

Test Example 12

The thermal conductivity and electrical conductivity of the graphene compositions of Examples 154-166 and Comparative Examples 27-28 were tested. The thermal conductivity was tested according to GB/T22588-2008, and the electrical conductivity was tested according to Q/JSGL 006-2014. The test results are listed in Table 12.

TABLE 12

| Example | Thermal conductivity, W/(m · K) | Electrical conductivity, S/m |
|---|---|---|
| Example 154 | 8.64 | 136 |
| Example 155 | 8.52 | 139 |
| Example 156 | 8.20 | 147 |
| Example 157 | 8.16 | 150 |
| Example 158 | 8.10 | 155 |
| Example 159 | 7.95 | 161 |
| Example 160 | 7.91 | 164 |
| Example 161 | 8.76 | 126 |
| Example 162 | 8.48 | 142 |
| Example 163 | 7.86 | 183 |
| Example 164 | 7.75 | 190 |
| Example 165 | 8.03 | 159 |
| Example 166 | 8.06 | 156 |
| Comparative Example 27 | 4.95 | 263 |
| Comparative Example 28 | 4.87 | 276 |

It can be seen from Table 12 that the graphene heat dissipation composition of the present disclosure has a higher thermal conductivity and a lower electrical conductivity. It can be seen from the comparison between Examples 154-160 that when, in the modified graphene, the weight ratio among the graphene oxide, silicate ester, inorganic alkali solution, water-soluble polymer compound and anionic surfactant is 1:(1-1.5):(0.5-5):(0.1-0.3):(0.05-0.5), or the weight ratio of the tetramethyl orthosilicate to trimethylsiloxysilicate is 1:(0.1-1), or the water-soluble polymer compound is polyacrylic acid having a weight-average molecular weight of 5,000 to 20,000, or when the surfactant consists of cetyltrimethylammonium bromide and methyl acrylate and the weight ratio between cetyltrimethylammonium bromide and methyl acrylate is 1:(0.1-0.8), it is beneficial to further increase the thermal conductivity of the graphene heat dissipation composition and reduce its electrical conductivity. It can be seen from the comparison between Examples 154-162 and Examples 163-164 that when the value of R calculated according to the formula R=2.376 w(modified graphene)+0.828 w(carbon nanotube)−1.755 w(metal thermal conductive material)+0.064 (additive) is 32.5-65.5, it is beneficial to further improve the thermal conductivity of the graphene heat dissipation composition and reduce its electrical conductivity. It can be seen from the comparison between Example 154 and Examples 165-166 that when the fluoropolymer consists of polytetrafluoroethylene and polyvinylidene fluoride and the weight ratio between polytetrafluoroethylene and polyvinylidene fluoride is 1:(2-6), it is beneficial to further improve the thermal conductivity of the graphene heat dissipation composition and reduce its electrical conductivity.

Test Example 13

The heat dissipation effects of the graphene heat dissipation compositions of Examples 154-166 and Comparative Examples 27-28 were tested.

The aluminum alloy heat sink with a size of 20 cm×10 cm×2 cm was subjected to surface cleaning treatment. The compositions of Examples 154-166 and Comparative Examples 27-28 were fully stirred and then poured into the spray gun. The spray gun pressure was set to 0.4 MPa. The heat sink was sprayed twice at desired locations thereof by a spacing of 20 cm, so that the surface of the heat sink was evenly coated with the composition, and then dried and cured naturally for 12 hours.

The heat sink obtained was connected to the CPU chip with a power of 30 W, then chip was turned on and the initial temperature of the chip was recorded, then the temperature of the CPU chip and the heat sink after 1 hour at room temperature (20° C.) was recorded. The test results are listed in Table 13.

TABLE 13

| Example | Initial temperature of CPU chip, ° C. | Temperature of CPU chip after 1 hour of operation, ° C. |
| --- | --- | --- |
| Example 154 | 25 | 35.6 |
| Example 155 | 25 | 35.8 |
| Example 156 | 25 | 36.2 |
| Example 157 | 25 | 36.4 |
| Example 158 | 25 | 36.7 |
| Example 159 | 25 | 37.1 |
| Example 160 | 25 | 37.2 |
| Example 161 | 25 | 35.4 |
| Example 162 | 25 | 35.9 |
| Example 163 | 25 | 38.3 |
| Example 164 | 25 | 38.5 |
| Example 165 | 25 | 37.0 |
| Example 166 | 25 | 36.8 |
| Comparative Example 27 | 25 | 56.6 |
| Comparative Example 28 | 25 | 59.3 |

It can be seen from Table 13 that the graphene heat dissipation composition of the present disclosure has a fast heat conduction rate and good heat dissipation efficiency. Specifically, the difference between the initial temperature and the final temperature after 1 hour of operation of the CPU chip of Comparative Examples 27-28 is 31.6-34.3° C., while difference between the initial temperature and the final temperature after 1 hour of operation of the CPU chip of Examples 154-166 is only 10.4-13.5° C., which proves that the graphene heat dissipation composition of the present disclosure has better heat dissipation effects.

Examples 167-195 illustrate the graphene composition provided by the present disclosure.

Example 167

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 1, 10 parts by weight of carbon nanotubes (purity≥95% by weight, ash content≤0.2% by weight, specific surface area: 100-200 m$^2$/g), 25 parts by weight of zinc oxide (particle size: 20-50 μm), and 12 parts by weight of stearic acid-silica composite.

The main phase change material was heated until it was completely melted, then other components were added and mixed for 30 min, and after cooling, the graphene composition of this example was obtained.

Examples 168-174

The graphene composition was prepared according to the method of Example 167, except that the modified graphene prepared in Examples 3, 5, 7, 9, 10, 11, and 12 were respectively used.

Example 175

The components and ratio thereof of the graphene composition of this example were: 100 parts by weight of the main phase change material (consisting of stearic acid and polyethylene wax and the weight ratio between stearic acid and polyethylene wax is 1:4, and phase transition temperature: 55-70° C.), 35 parts by weight of the modified graphene prepared in Example 1, 6 parts by weight of carbon nanotubes (purity≥95% by weight, ash content≤0.2% by weight, specific surface area: 100-200 m$^2$/g), 15 parts by weight of copper (particle size: 20-50 μm), and 8 parts by weight of stearic acid-silica composite.

The main phase change material was heated until it was completely melted, then other components were added and mixed for 30 min, and after cooling, the graphene composition of this example was obtained.

Example 176

The components and ratio thereof of the graphene composition of this example were: 100 parts by weight of the main phase change material (consisting of stearic acid and polyethylene wax and the weight ratio between stearic acid and polyethylene wax is 1:0.5, and phase transition temperature: 60-75° C.), 40 parts by weight of the modified graphene prepared in Example 1, 12 parts by weight of carbon nanotubes (purity≥95% by weight, ash content≤0.2% by weight, specific surface area: 100-200 m$^2$/g), 10 parts by weight of silver (particle size: 20-50 μm), and 18 parts by weight of stearic acid-silica composite.

The main phase change material was heated until it was completely melted, then other components were added and mixed for 30 min, and after cooling, the graphene composition of this example was obtained.

Example 177

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 5 parts by weight of the modified graphene prepared in Example 1, 20 parts by weight of carbon nanotubes (purity≥95% by weight, ash content≤0.2% by weight, specific surface area: 100-200 m$^2$/g), 5 parts by weight of zinc oxide (particle size: 20-50 μm), and 20 parts by weight of stearic acid-silica composite.

The main phase change material was heated until it was completely melted, then other components were added and mixed for 30 min, and after cooling, the graphene composition of this example was obtained.

Example 178

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 10 parts by weight of the modified graphene prepared in Example 1, 18 parts by weight of carbon nanotubes (purity≥95% by weight, ash content≤0.2% by weight, specific surface area: 100-200 m$^2$/g), 35 parts by weight of zinc oxide (particle size: 20-50 μm), and 2 parts by weight of stearic acid-silica composite.

The main phase change material was heated until it was completely melted, then other components were added and mixed for 30 min, and after cooling, the graphene composition of this example was obtained.

Example 179

The difference between the graphene composition of this example and that of Example 167 is that the main phase change material consists of polyethylene wax, and the phase transition temperature is 55-60° C.

Example 180

The difference between the graphene heat dissipation composition of this example and that of Example 167 is that the main phase change material consists of polyethylene glycol (weight-average molecular weight: 6,000) and liquid paraffin and the weight ratio between polyethylene glycol and liquid paraffin is 1:8, and the phase transition temperature is 55-65° C.

Example 181

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 1, 10 parts by weight of carbon nanotubes (purity≥95% by weight, ash content≤0.2% by weight, specific surface area: 100-200 m$^2$/g), 25 parts by weight of zinc oxide (particle size: 20-50 μm), 12 parts by weight of stearic acid-silica composite, and 2 parts by weight of thixotropic agent polyamide wax.

The main phase change material was heated until it was completely melted, then other components were added and mixed for 30 min, and after cooling, the graphene composition of this example was obtained.

Example 182

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 15, 10 parts by weight of carbon nanotubes (purity≥95% by weight, ash content≤0.2% by weight, specific surface area: 100-200 m$^2$/g), 25 parts by weight of zinc oxide (particle size: 20-50 μm), and 12 parts by weight of stearic acid-silica composite.

The main phase change material was heated until it was completely melted, then other components were added and mixed for 30 min, and after cooling, the graphene composition of this example was obtained.

Examples 183-188

The graphene composition was prepared according to the method of Example 182, except that the modified graphene prepared in Examples 17, 19, 24, 25, 26, and 27 were respectively used.

Example 189

The components and ratio thereof of the graphene composition of this example were: 100 parts by weight of the main phase change material (consisting of stearic acid and polyethylene wax and the weight ratio between stearic acid and polyethylene wax is 1:4, and phase transition temperature: 55-70° C.), 35 parts by weight of the modified graphene prepared in Example 15, 6 parts by weight of carbon nanotubes (purity≥95% by weight, ash content≤0.2% by weight, specific surface area: 100-200 m$^2$/g), 15 parts by weight of copper (particle size: 20-50 μm), and 8 parts by weight of stearic acid-silica composite.

The main phase change material was heated until it was completely melted, then other components were added and mixed for 30 min, and after cooling, the graphene composition of this example was obtained.

Example 190

The components and ratio thereof of the graphene composition of this example were: 100 parts by weight of the main phase change material (consisting of stearic acid and polyethylene wax and the weight ratio between stearic acid and polyethylene wax is 1:0.5, and phase transition temperature: 60-75° C.), 40 parts by weight of the modified graphene prepared in Example 15, 12 parts by weight of carbon nanotubes (purity≥95% by weight, ash content≤0.2% by weight, specific surface area: 100-200 m$^2$/g), 10 parts by weight of silver (particle size: 20-50 μm), and 18 parts by weight of stearic acid-silica composite.

The main phase change material was heated until it was completely melted, then other components were added and mixed for 30 min, and after cooling, the graphene composition of this example was obtained.

Example 191

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 5 parts by weight of the modified graphene prepared in Example 15, 20 parts by weight of carbon nanotubes (purity≥95% by weight, ash content≤0.2% by weight, specific surface area: 100-200 m$^2$/g), 5 parts by weight of zinc oxide (particle size: 20-50 μm), and 20 parts by weight of stearic acid-silica composite.

The main phase change material was heated until it was completely melted, then other components were added and mixed for 30 min, and after cooling, the graphene composition of this example was obtained.

Example 192

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 10 parts by weight of the modified graphene prepared in Example 15, 18 parts by weight of carbon nanotubes (purity≥95% by weight, ash content≤0.2% by weight, specific surface area: 100-200 $m^2/g$), 35 parts by weight of zinc oxide (particle size: 20-50 μm), and 2 parts by weight of stearic acid-silica composite.

The main phase change material was heated until it was completely melted, then other components were added and mixed for 30 min, and after cooling, the graphene composition of this example was obtained.

Example 193

The difference between the graphene composition of this example and that of Example 182 is that the main phase change material consists of polyethylene wax, and the phase transition temperature is 55-60° C.

Example 194

The difference between the graphene heat dissipation composition of this example and that of Example 182 is that the main phase change material consists of polyethylene glycol (weight-average molecular weight: 6,000) and liquid paraffin and the weight ratio between polyethylene glycol and liquid paraffin is 1:8, and the phase transition temperature is 55-65° C.

Example 195

The components and ratio thereof of the graphene composition of this example were: 100 parts by weight of the main phase change material (consisting of stearic acid and polyethylene wax and the weight ratio between stearic acid and polyethylene wax is of 1:8, and phase transition temperature: 55-65° C.), 30 parts by weight of the modified graphene prepared in Example 15, 10 parts by weight of carbon nanotubes (purity≥95% by weight, ash content≤0.2% by weight, specific surface area: 100-200 $m^2/g$), 25 parts by weight of zinc oxide (particle size: 20-50 μm), 12 parts by weight of stearic acid-silica composite, and 2 parts by weight of thixotropic agent polyamide wax.

The main phase change material was heated until it was completely melted, then other components were added and mixed for 30 min, and after cooling, the graphene composition of this example was obtained.

Comparative Examples 29-33 illustrate the graphene composition different from the present disclosure.

Comparative Example 29

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 4 parts by weight of the modified graphene prepared in Example 1, 25 parts by weight of carbon nanotubes (purity≥95% by weight, ash content≤0.2% by weight, specific surface area: 100-200 $m^2/g$), 4 parts by weight of zinc oxide (particle size: 20-50 μm), and 1 part by weight of stearic acid-silica composite.

The main phase change material was heated until it was completely melted, then other components were added and mixed for 30 min, and after cooling, the graphene composition of this example was obtained.

Comparative Example 30

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 35 parts by weight of the modified graphene prepared in Example 1, 0.5 parts by weight of carbon nanotubes (purity≥95% by weight, ash content≤0.2% by weight, specific surface area: 100-200 $m^2/g$), 45 parts by weight of zinc oxide (particle size: 20-50 μm), and 32 parts by weight of stearic acid-silica composite.

The main phase change material was heated until it was completely melted, then other components were added and mixed for 30 min, and after cooling, the graphene composition of this example was obtained.

Comparative Example 31

The difference between the graphene composition of this comparative example and that of Example 167 is that the graphene oxide was not modified, that is, the same amount of graphene oxide was used to replace the modified graphene in Example 1.

Comparative Example 32

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 4 parts by weight of the modified graphene prepared in Example 15, 25 parts by weight of carbon nanotubes (purity≥95% by weight, ash content≤0.2% by weight, specific surface area: 100-200 $m^2/g$), 4 parts by weight of zinc oxide (particle size: 20-50 μm), and 1 part by weight of stearic acid-silica composite.

The main phase change material was heated until it was completely melted, then other components were added and mixed for 30 min, and after cooling, the graphene composition of this example was obtained.

Comparative Example 33

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 35 parts by weight of the modified graphene prepared in Example 15, 0.5 parts by weight of carbon nanotubes (purity≥95% by weight, ash content≤0.2% by weight, specific surface area: 100-200 m²/g), 45 parts by weight of zinc oxide (particle size: 20-50 μm), and 32 parts by weight of stearic acid-silica composite.

The main phase change material was heated until it was completely melted, then other components were added and mixed for 30 min, and after cooling, the graphene composition of this example was obtained.

Test Example 14

The specific heat capacity, thermal conductivity and electrical conductivity of the graphene heat dissipation compositions of Examples 167-195 and Comparative Examples 29-33 were tested. The specific heat capacity was tested according to ASTME1269-11, the thermal conductivity was tested according to GB/T22588-2008, and the electrical conductivity was tested according to O/JSGL 006-2014. The test results are listed in Table 14.

TABLE 14

| Example | Specific heat capacity, J/(g · K) | Thermal conductivity, W/(m · K) | Electrical conductivity, S/m |
|---|---|---|---|
| Example 167 | 3.07 | 3.21 | 181 |
| Example 168 | 3.04 | 3.10 | 175 |
| Example 169 | 3.15 | 3.42 | 168 |
| Example 170 | 2.86 | 2.86 | 192 |
| Example 171 | 2.80 | 2.82 | 195 |
| Example 172 | 2.74 | 2.78 | 200 |
| Example 173 | 2.71 | 2.63 | 205 |
| Example 174 | 2.66 | 2.58 | 209 |
| Example 175 | 3.13 | 3.33 | 178 |
| Example 176 | 3.06 | 3.17 | 186 |
| Example 177 | 2.60 | 2.43 | 228 |
| Example 178 | 2.55 | 2.32 | 235 |
| Example 179 | 2.72 | 2.65 | 204 |
| Example 180 | 2.75 | 2.79 | 199 |
| Example 181 | 3.08 | 3.22 | 185 |
| Example 182 | 2.87 | 3.11 | 195 |
| Example 183 | 2.73 | 2.98 | 188 |
| Example 184 | 2.64 | 2.75 | 207 |
| Example 185 | 2.59 | 2.72 | 211 |
| Example 186 | 2.53 | 2.67 | 216 |
| Example 187 | 2.49 | 2.52 | 222 |
| Example 188 | 2.44 | 2.46 | 226 |
| Example 189 | 2.91 | 3.20 | 193 |
| Example 190 | 2.84 | 3.06 | 201 |
| Example 191 | 2.38 | 2.31 | 244 |
| Example 192 | 2.33 | 2.22 | 251 |
| Example 193 | 2.50 | 2.54 | 220 |
| Example 194 | 2.52 | 2.67 | 214 |
| Example 195 | 2.88 | 3.12 | 196 |
| Comparative Example 29 | 1.96 | 0.85 | 316 |
| Comparative Example 30 | 1.84 | 0.82 | 335 |
| Comparative Example 31 | 1.22 | 0.46 | 367 |
| Comparative Example 32 | 1.72 | 0.76 | 331 |
| Comparative Example 33 | 1.60 | 0.70 | 359 |

It can be seen from Table 14 that the thermal conductive composition of the present disclosure has a higher specific heat capacity, a higher thermal conductivity, and a lower electrical conductivity.

In the embodiments where the surfactant is an anionic surfactant, it can be seen from the comparison between Examples 167-174 that when, in the modified graphene, the weight ratio among the graphene oxide, silicate ester, inorganic alkali solution, water-soluble polymer compound and anionic surfactant is 1:(1.8-2.8):(0.6-1):(0.3-0.6):(0.1-0.25), or the weight ratio between the tetramethyl orthosilicate and trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the specific heat capacity and thermal conductivity of the graphene composition and reduce its electrical conductivity. It can be seen from the comparison between Examples 167-176 and Examples 177-178 that when the value of R calculated according to the formula R=0.78 w(modified graphene)+0.66 w(carbon nanotube)−0.24 w(metal thermal conductive particulate matter)+0.15 (composite auxiliary agent) is 22.5-40.5, it is beneficial to further improve the specific heat capacity, thermal conductivity of the graphene heat dissipation composition and reduce its electrical conductivity. It can be seen from the comparison between Example 167 and Examples 179-180 that when the main phase change material consists of stearic acid and polyethylene wax and the weight ratio between stearic acid and polyethylene wax is 1:(0.1-10), it is beneficial to further improve the thermal conductivity of the graphene composition and reduce its electrical conductivity.

In the embodiment where the surfactant is a nonionic surfactant, it can be seen from the comparison between Examples 182-188 that when, in the modified graphene, the weight ratio among the graphene oxide, silicate ester, inorganic alkali solution, water-soluble polymer compound and non-ionic surfactant is 1:(1.8-2.8):(0.6-1):(0.08-0.25):(0.3-0.6), or the weight ratio between the tetramethyl orthosilicate and trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the specific heat capacity and thermal conductivity of the graphene composition and reduce its electrical conductivity. It can be seen from the comparison between Examples 182-190 and Examples 191-192 that when the value of R calculated according to the formula R=0.78 w(modified graphene)+0.66 w(carbon nanotube)−0.24 w(metal thermal conductive particulate matter)+0.15 (composite auxiliary agent) is 22.5-40.5, it is beneficial to further improve the specific heat capacity, thermal conductivity of the graphene heat dissipation composition and reduce its electrical conductivity. It can be seen from the comparison between Example 182 and Examples 193-194 that when the main phase change material consists of stearic acid and polyethylene wax and the weight ratio between stearic acid and polyethylene wax is 1:(0.1-10), it is beneficial to further improve the thermal conductivity of the graphene composition and reduce its electrical conductivity.

Examples 196-210 illustrate the graphene composition provided by the present disclosure.

Example 196

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 30, 10 parts by weight of carbon nanotubes (purity≥95% by weight, ash content≤0.2% by weight, specific surface area: 100-200 m²/g), 25 parts by weight of zinc oxide (particle size: 20-50 μm), and 12 parts by weight of stearic acid-silica composite.

The main phase change material was heated until it was completely melted, then other components were added and mixed for 30 min, and after cooling, the graphene composition of this example was obtained.

Examples 197-203

The graphene composition was prepared according to the method of Example 196, except that the modified graphene prepared in Examples 32, 34, 36, 39, 40, 41, and 43 were respectively used.

Example 204

The components and ratio thereof of the graphene composition of this example were: 100 parts by weight of the main phase change material (consisting of stearic acid and polyethylene wax and the weight ratio between stearic acid and polyethylene wax is 1:4, and phase transition temperature: 55-70° C.), 35 parts by weight of the modified graphene prepared in Example 30, 6 parts by weight of carbon nanotubes (purity≥95% by weight, ash content≤0.2% by weight, specific surface area: 100-200 m$^2$/g), 15 parts by weight of copper (particle size: 20-50 μm), and 8 parts by weight of stearic acid-silica composite.

The main phase change material was heated until it was completely melted, then other components were added and mixed for 30 min, and after cooling, the graphene composition of this example was obtained.

Example 205

The components and ratio thereof of the graphene composition of this example were: 100 parts by weight of the main phase change material (consisting of stearic acid and polyethylene wax and the weight ratio between stearic acid and polyethylene wax is 1:0.5, and phase transition temperature: 60-75° C.), 40 parts by weight of the modified graphene prepared in Example 30, 12 parts by weight of carbon nanotubes (purity≥95% by weight, ash content≤0.2% by weight, specific surface area: 100-200 m$^2$/g), 10 parts by weight of silver (particle size: 20-50 μm), and 18 parts by weight of stearic acid-silica composite.

The main phase change material was heated until it was completely melted, then other components were added and mixed for 30 min, and after cooling, the graphene composition of this example was obtained.

Example 206

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 5 parts by weight of the modified graphene prepared in Example 30, 20 parts by weight of carbon nanotubes (purity≥95% by weight, ash content≤0.2% by weight, specific surface area: 100-200 m$^2$/g), 5 parts by weight of zinc oxide (particle size: 20-50 μm), and 20 parts by weight of stearic acid-silica composite.

The main phase change material was heated until it was completely melted, then other components were added and mixed for 30 min, and after cooling, the graphene composition of this example was obtained.

Example 207

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 10 parts by weight of the modified graphene prepared in Example 30, 18 parts by weight of carbon nanotubes (purity≥95% by weight, ash content≤0.2% by weight, specific surface area: 100-200 m$^2$/g), 35 parts by weight of zinc oxide (particle size: 20-50 μm), and 2 parts by weight of stearic acid-silica composite.

The main phase change material was heated until it was completely melted, then other components were added and mixed for 30 min, and after cooling, the graphene composition of this example was obtained.

Example 208

The difference between the graphene composition of this example and that of Example 196 is that the main phase change material consists of polyethylene wax, and the phase transition temperature is 55-60° C.

Example 209

The difference between the graphene heat dissipation composition of this example and that of Example 196 is that the main phase change material consists of polyethylene glycol (weight-average molecular weight: 6,000) and liquid paraffin and the weight ratio between polyethylene glycol and the liquid paraffin is 1:8, and the phase transition temperature is 55-65° C.

Example 210

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 30, 10 parts by weight of carbon nanotubes (purity≥95% by weight, ash content≤0.2% by weight, specific surface area: 100-200 m$^2$/g), 25 parts by weight of zinc oxide (particle size: 20-50 μm), 12 parts by weight of stearic acid-silica composite, and 2 parts by weight of thixotropic agent polyamide wax.

The main phase change material was heated until it was completely melted, then other components were added and mixed for 30 min, and after cooling, the graphene composition of this example was obtained.

Comparative Examples 34-35 illustrate thermal conductive compositions different from those of the present disclosure.

Comparative Example 34

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 4 parts by weight of the modified graphene prepared in Example 30, 25 parts by weight of carbon nanotubes (purity≥95% by weight, ash content≤0.2% by weight, specific surface area: 100-200 m²/g), 4 parts by weight of zinc oxide (particle size: 20-50 μm), and 1 part by weight of stearic acid-silica composite.

The main phase change material was heated until it was completely melted, then other components were added and mixed for 30 min, and after cooling, the graphene composition of this example was obtained.

Comparative Example 35

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 35 parts by weight of the modified graphene prepared in Example 30, 0.5 parts by weight of carbon nanotubes (purity≥95% by weight, ash content≤0.2% by weight, specific surface area: 100-200 m²/g), 45 parts by weight of zinc oxide (particle size: 20-50 μm), and 32 parts by weight of stearic acid-silica composite.

The main phase change material was heated until it was completely melted, then other components were added and mixed for 30 min, and after cooling, the graphene composition of this example was obtained.

Test Example 15

The specific heat capacity, thermal conductivity and electrical conductivity of the graphene heat dissipation compositions of Examples 196-210 and Comparative Examples 34-35 were tested. The specific heat capacity was tested according to ASTME1269-11, the thermal conductivity was tested according to GB/T22588-2008, and the electrical conductivity was tested according to Q/JSGL 006-2014. The test results are listed in Table 15.

TABLE 15

| Example | Specific heat capacity, J/(g · K) | Thermal conductivity, W/(m · K) | Electrical conductivity, S/m |
| --- | --- | --- | --- |
| Example 196 | 3.15 | 3.29 | 170 |
| Example 197 | 3.12 | 3.18 | 164 |
| Example 198 | 3.23 | 3.51 | 155 |
| Example 199 | 3.01 | 2.94 | 181 |
| Example 200 | 2.94 | 2.90 | 185 |
| Example 201 | 2.89 | 2.86 | 189 |
| Example 202 | 2.85 | 2.71 | 194 |
| Example 203 | 2.80 | 2.66 | 199 |
| Example 204 | 3.28 | 3.40 | 167 |
| Example 205 | 3.18 | 3.31 | 175 |
| Example 206 | 2.75 | 2.52 | 216 |
| Example 207 | 2.70 | 2.40 | 224 |
| Example 208 | 2.87 | 2.73 | 193 |
| Example 209 | 2.91 | 2.87 | 188 |
| Example 210 | 3.16 | 3.30 | 171 |
| Comparative Example 34 | 2.02 | 0.89 | 312 |
| Comparative Example 35 | 1.91 | 0.86 | 328 |

It can be seen from Table 15 that the thermal conductive composition of the present disclosure has a higher specific heat capacity, a higher thermal conductivity, and a lower electrical conductivity. It can be seen from the comparison between Examples 196-203 that when, in the modified graphene, the weight ratio among the graphene oxide, silicate ester, inorganic alkali solution, water-soluble polymer compound and anionic surfactant is 1:(1.8-2.8):(0.6-1):(0.2-0.6):(0.1-0.5), or the weight ratio of the tetramethyl orthosilicate to trimethylsiloxysilicate is 1:(0.1-1), or the water-soluble polymer compound is polyacrylic acid having a weight-average molecular weight of 5,000 to 20,000, or when the surfactant is of a special combination and ratio, it is beneficial to further increase the specific heat capacity and thermal conductivity of the graphene composition and reduce its electrical conductivity. It can be seen from the comparison between Examples 196-205 and Examples 206-207 that when the value of R calculated according to the formula R=0.78 w(modified graphene)+0.66 w(carbon nanotube)−0.24 w(metal thermal conductive particulate matter)+0.15 (composite auxiliary agent) is 22.5-40.5, it is beneficial to further improve the specific heat capacity, thermal conductivity of the graphene heat dissipation composition and reduce its electrical conductivity. It can be seen from the comparison between Example 196 and Examples 208-209 that when the main phase change material consists of stearic acid and polyethylene wax and the weight ratio between stearic acid and polyethylene wax is 1:(0.1-10), it is beneficial to further improve the thermal conductivity of the graphene composition and reduce its electrical conductivity.

Examples 211-224 illustrate the graphene composition provided by the present disclosure.

Example 211

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene, 10 parts by weight of carbon nanotubes (purity≥95% by weight, ash content≤0.2% by weight, specific surface area: 100-200 m²/g), 25 parts by weight of zinc oxide (particle size: 20-50 μm), and 12 parts by weight of stearic acid-silica composite.

The preparation of the modified graphene is as follows: graphene oxide, tetramethyl orthosilicate, trimethylsiloxysilicate, sodium hydroxide solution (concentration: 30 g/L), polyacrylic acid (weight-average molecular weight: 5,000), cetyltrimethylammonium bromide and methyl acrylate were mixed according to the weight ratio of 1:1:0.2:2.5:0.2:0.1:0.06, reacted at 40° C. for 2 hours, then the solid product was collected and dried at 120° C. for 2 hours.

The main phase change material was heated until it was completely melted, then other components were added and mixed for 30 min, and after cooling, the graphene composition of this example was obtained.

Example 212

The difference between the graphene composition of this example and that of Example 211 is that the modified graphene was prepared as follows: graphene oxide, tetramethyl orthosilicate, trimethylsiloxysilicate, sodium carbonate solution (concentration: 60 g/L), polyacrylic acid (weight-average molecular weight: 5,000), cetyltrimethylammonium bromide and methyl acrylate were mixed according to the weight ratio of 1:0.5:0.5:1.3:0.1:0.2:0.04, reacted at 30° C. for 4 hours, then the solid product was collected and dried at 120° C. for 2 hours.

Example 213

The difference between the graphene composition of this example and that of Example 211 is that the modified graphene was prepared as follows: graphene oxide, tetramethyl orthosilicate, trimethylsiloxysilicate, sodium hydroxide solution (concentration: 30 g/L), polyacrylic acid (weight-average molecular weight: 5,000), cetyltrimethylammonium bromide and methyl acrylate were mixed according to the weight ratio of 1:1:0.2:2.5:0.2:0.1:0.06, stirred and reacted at 40° C. for 2 hours, then the solid product was collected and dried at 120° C. for 2 hours.

Example 214

The difference between the graphene composition of this example and that of Example 211 is that the modified graphene was prepared as follows: graphene oxide, tetramethyl orthosilicate, sodium hydroxide solution (concentration: 30 g/L), polyacrylic acid (weight-average molecular weight: 5,000), cetyltrimethylammonium bromide and methyl acrylate were mixed according to the weight ratio of 1:1.2:2.5:0.2:0.1:0.06, reacted at 40° C. for 2 hours, then the solid product was collected and dried at 120° C. for 2 hours.

Example 215

The difference between the graphene composition of this example and that of Example 211 is that the modified graphene was prepared as follows: graphene oxide, tetramethyl orthosilicate, trimethylsiloxysilicate, sodium hydroxide solution (concentration: 30 g/L), polymaleic anhydride (weight-average molecular weight: 10,000), cetyltrimethylammonium bromide and methyl acrylate were mixed according to the weight ratio of 1:1:0.2:2.5:0.2:0.1:0.06, reacted at 40° C. for 2 hours, then the solid product was collected and dried at 120° C. for 2 hours.

Example 216

The difference between the graphene composition of this example and that of Example 211 is that the modified graphene was prepared as follows: graphene oxide, tetramethyl orthosilicate, trimethylsiloxysilicate, sodium hydroxide solution (concentration: 30 g/L), polyacrylic acid (weight average molecular weight: 5,000), cetyltrimethylammonium bromide and methyl acrylate were mixed according to the weight ratio of 1:1:1:0.2:0.5:0.5:0.05, reacted at 40° C. for 2 hours, then the solid product was collected and dried at 120° C. for 2 hours.

Example 217

The difference between the graphene composition of this example and that of Example 211 is that the modified graphene was prepared as follows: graphene oxide, tetramethyl orthosilicate, trimethylsiloxysilicate, sodium hydroxide solution (concentration: 30 g/L), polyacrylic acid (weight average molecular weight: 5,000), cetyltrimethylammonium bromide and methyl acrylate were mixed according to the weight ratio of 1:0.3:0.2:6:0.05:0.02:0.01, reacted at 40° C. for 2 hours, then the solid product was collected and dried at 120° C. for 2 hours.

Example 218

The components and ratio thereof of the graphene composition of this example were: 100 parts by weight of the main phase change material (consisting of stearic acid and polyethylene wax and the weight ratio between stearic acid and polyethylene wax is 1:4, and phase transition temperature: 55-70° C.), 35 parts by weight of the modified graphene prepared in Example 46, 6 parts by weight of carbon nanotubes (purity≥95% by weight, ash content≤0.2% by weight, specific surface area: 100-200 $m^2/g$), 15 parts by weight of copper (particle size: 20-50 μm), and 8 parts by weight of stearic acid-silica composite.

The main phase change material was heated until it was completely melted, then other components were added and mixed for 30 min, and after cooling, the graphene composition of this example was obtained.

Example 219

The components and ratio thereof of the graphene composition of this example were: 100 parts by weight of the main phase change material (consisting of stearic acid and polyethylene wax and the weight ratio between stearic acid and polyethylene wax is 1:0.5, and phase transition temperature: 60-75° C.), 40 parts by weight of the modified graphene prepared in Example 46, 12 parts by weight of carbon nanotubes (purity≥95% by weight, ash content≤0.2% by weight, specific surface area: 100-200 $m^2/g$), 10 parts by weight of silver (particle size: 20-50 μm), and 18 parts by weight of stearic acid-silica composite.

The main phase change material was heated until it was completely melted, then other components were added and mixed for 30 min, and after cooling, the graphene composition of this example was obtained.

Example 220

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 5 parts by weight of the modified graphene prepared in Example 46, 20 parts by weight of carbon nanotubes (purity≥95% by weight, ash content≤0.2% by weight, specific surface area: 100-200 $m^2/g$), 5 parts by weight of zinc oxide (particle size: 20-50 μm), and 20 parts by weight of stearic acid-silica composite.

The main phase change material was heated until it was completely melted, then other components were added and mixed for 30 min, and after cooling, the graphene composition of this example was obtained.

Example 221

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-70° C.), 10 parts by weight of the modified graphene prepared in Example 46, 18 parts by weight of carbon nanotubes (purity≥95% by weight, ash content≤0.2% by weight, specific surface area: 100-200 $m^2/g$), 35 parts by weight of zinc oxide (particle size: 20-50 μm), and 2 parts by weight of stearic acid-silica composite.

The main phase change material was heated until it was completely melted, then other components were added and mixed for 30 min, and after cooling, the graphene composition of this example was obtained.

Example 222

The difference between the graphene composition of this example and that of Example 211 is that the main phase change material consists of polyethylene wax, and the phase transition temperature is 55-60° C.

Example 223

The difference between the graphene composition of this example and that of Example 211 is that the main phase change material consists of polyethylene glycol (weight average molecular weight: 6,000) and liquid paraffin and the weight ratio between polyethylene glycol and liquid paraffin is 1:8, and the phase transition temperature is 55-65° C.

Example 224

The components and ratio thereof of the graphene composition of this example were: 100 parts by weight of the main phase change material (consisting of stearic acid and polyethylene wax and the weight ratio between stearic acid and polyethylene wax is 1:8, and phase transition temperature: 55-65° C.), 30 parts by weight of the modified graphene prepared in Example 46, 10 parts by weight of carbon nanotubes (purity≥95% by weight, ash content≤0.2% by weight, specific surface area: 100-200 m²/g), 25 parts by weight of zinc oxide (particle size: 20-50 μm), 12 parts by weight of stearic acid-silica composite, and 2 parts by weight of thixotropic agent polyamide wax.

The main phase change material was heated until it was completely melted, then other components were added and mixed for 30 min, and after cooling, the graphene composition of this example was obtained.

Comparative Examples 36-37 illustrate thermal conductive compositions different from those of the present disclosure.

Comparative Example 36

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 4 parts by weight of the modified graphene prepared in Example 46, 25 parts by weight of carbon nanotubes (purity≥95% by weight, ash content≤0.2% by weight, specific surface area: 100-200 m²/g), 4 parts by weight of zinc oxide (particle size: 20-50 μm), and 1 part by weight of stearic acid-silica composite.

The main phase change material was heated until it was completely melted, then other components were added and mixed for 30 min, and after cooling, the graphene composition of this example was obtained.

Comparative Example 37

The components and ratio thereof of the graphene composition of this comparative example were: 100 parts by weight of the main phase change material (consisting of stearic acid and polyethylene wax and the weight ratio between stearic acid and polyethylene wax is 1:8, and phase transition temperature: 55-65° C.), 35 parts by weight of the modified graphene prepared in Example 46, 0.5 parts by weight of carbon nanotubes (purity≥95% by weight, ash content≤0.2% by weight, specific surface area: 100-200 m²/g), 45 parts by weight of zinc oxide (particle size: 20-50 μm), and 32 parts by weight of stearic acid-silica composite.

The main phase change material was heated until it was completely melted, then other components were added and mixed for 30 min, and after cooling, the graphene composition of this example was obtained.

Test Example 16

The specific heat capacity, thermal conductivity and electrical conductivity of the graphene heat dissipation compositions of Examples 211-224 and Comparative Examples 36-37 were tested. The specific heat capacity was tested according to ASTME1269-11, the thermal conductivity was tested according to GB/T22588-2008, and the electrical conductivity was tested according to Q/JSGL 006-2014. The test results are listed in Table 16.

TABLE 16

| Example | Specific heat capacity, J/(g · K) | Thermal conductivity, W/(m · K) | Electrical conductivity, S/m |
| --- | --- | --- | --- |
| Example 211 | 3.18 | 3.65 | 165 |
| Example 212 | 3.14 | 3.53 | 168 |
| Example 213 | 2.98 | 3.21 | 176 |
| Example 214 | 2.92 | 3.17 | 179 |
| Example 215 | 2.86 | 3.11 | 184 |
| Example 216 | 2.81 | 2.96 | 190 |
| Example 217 | 2.77 | 2.92 | 193 |
| Example 218 | 3.25 | 3.77 | 155 |
| Example 219 | 3.12 | 3.49 | 171 |
| Example 220 | 2.72 | 2.87 | 212 |
| Example 221 | 2.66 | 2.76 | 219 |
| Example 222 | 2.83 | 3.04 | 185 |
| Example 223 | 2.86 | 3.07 | 188 |
| Example 224 | 3.19 | 3.66 | 163 |
| Comparative Example 36 | 2.11 | 0.96 | 282 |
| Comparative Example 37 | 2.09 | 0.88 | 296 |

It can be seen from Table 16 that the thermal conductive composition of the present disclosure has a higher specific heat capacity, a higher thermal conductivity, and a lower electrical conductivity. It can be seen from the comparison between Examples 211-217 that when, in the modified graphene, the weight ratio among the graphene oxide, silicate ester, inorganic alkali solution, water-soluble polymer compound and anionic surfactant is 1:(1-1.5):(0.5-5):(0.1-0.3):(0.05-0.5), or the weight ratio of the tetramethyl orthosilicate to trimethylsiloxysilicate is 1:(0.1-1), or the water-soluble polymer compound is polyacrylic acid having a weight-average molecular weight of 5,000 to 20,000, or when the surfactant consists of cetyltrimethylammonium bromide and methyl acrylate and the weight ratio between cetyltrimethylammonium bromide and methyl acrylate is 1:(0.1-0.8), it is beneficial to further increase the specific heat capacity and thermal conductivity of the graphene heat dissipation composition and reduce its electrical conductivity. It can be seen from the comparison between Examples 211-219 and Examples 220-221 that when the value of R calculated according to the formula R=0.78 w(modified graphene)+0.66 w(carbon nanotube)−0.24 w(metal thermal conductive particulate matter)+0.15 (composite auxiliary agent) is 22.5-40.5, it is beneficial to further improve the specific heat capacity, thermal conductivity of the graphene heat dissipation composition and reduce its electrical conductivity. It can be seen from the comparison between Example 211 and Examples 222-223 that when the main phase change material consists of stearic acid and polyethylene wax and the weight ratio between stearic acid and polyethylene wax is 1:(0.1-10), it is beneficial to further improve the thermal conductivity of the graphene composition and reduce its electrical conductivity.

The preferred embodiments of the present disclosure are described in detail above. However, the present disclosure is not limited to the specific details of the aforementioned embodiments, and within the technical conception of the present disclosure, a variety of simple variants of the technical solutions of the present disclosure are possible, all of which are within the scope of protection of the present disclosure.

It should also be noted that the various specific technical features described in the above embodiments can be combined in any suitable manner without contradiction. For example, in order to avoid unnecessary repetition, the present disclosure does not provide a separate description of the various possible combinations.

In addition, various embodiments of the present disclosure can also be combined as desired and regarded as the content disclosed in the present disclosure, as long as they do not go beyond the principles of the present disclosure.

The invention claimed is:

1. A modification method for graphene, comprising: mixing graphene oxide, a silicate ester, an inorganic alkali solution, a water-soluble polymer compound and a surfactant, followed by reacting at 10 to 50° C. for 0.1 to 10 hours, collecting and drying a solid product of the reaction to obtain the modified graphene, wherein the surfactant is at least one selected from the group consisting of cationic surfactants, anionic surfactants, nonionic surfactants, and zwitterionic surfactants;
   wherein the silicate ester consists of tetramethyl orthosilicate and trimethylsiloxysilicate, and the weight ratio between tetramethyl orthosilicate and trimethylsiloxysilicate is 1:(0.1-1);
   the inorganic alkali solution has a concentration of 30 to 100 g/L, and the inorganic alkali solution is at least one selected from the group consisting of sodium hydroxide solution, potassium hydroxide solution, calcium hydroxide solution, sodium carbonate solution, sodium bicarbonate solution, and potassium carbonate solution; and
   the water-soluble polymer compound is polyacrylic acid, and the water-soluble polymer compound has a weight-average molecular weight of 5,000 to 20,000.

2. The method of claim 1, wherein the surfactant is an anionic surfactant, and the weight ratio among the graphene oxide, silicate ester, inorganic alkali solution, water-soluble polymer compound and anionic surfactant is 1:(0.5-4):(0.01-2):(0.1-0.8):(0.02-0.5).

3. The method of claim 2, wherein the anionic surfactant consists of sodium dodecylbenzene sulfonate and sodium lignosulfonate, and the weight ratio between sodium dodecylbenzene sulfonate and sodium lignosulfonate is 1:(1-2).

4. The method of claim 1, wherein the surfactant is a nonionic surfactant, wherein the weight ratio among the graphene oxide, silicate ester, inorganic alkali solution, water-soluble polymer compound and nonionic surfactant is 1:(0.5-4):(0.01-2):(0.05-0.5):(0.1-0.8).

5. The method of claim 4, wherein the nonionic surfactant consists of polyvinyl alcohol and polyethylene glycol, wherein the weight ratio between the polyvinyl alcohol and polyethylene glycol is 1:(0.1-0.6), and the weight-average molecular weight of the polyvinyl alcohol is 1,000-5,000, the weight-average molecular weight of the polyethylene glycol is 200-1,000.

6. The method of claim 1, wherein the surfactant consists of an anionic surfactant and a nonionic surfactant, wherein the weight ratio among the graphene oxide, silicate, inorganic alkali solution, water-soluble polymer compound, and surfactant is 1:(0.5-4):(0.01-2):(0.1-0.8):(0.01-0.8), and wherein the weight ratio between the anionic surfactant and the nonionic surfactant is 1:(0.001-2).

7. The method of claim 1, wherein the surfactant consists of a cationic surfactant and/or a zwitterionic surfactant, and wherein the weight ratio among the graphene oxide, silicate ester, inorganic alkali solution, water-soluble polymer compound and surfactant is 1:(0.5-6):(0.1-10):(0.02-0.5):(0.02-1).

8. The method of claim 1, further comprising carrying out the reaction in presence of a coupling agent, wherein the weight ratio of the graphene oxide to the coupling agent is 1:(0.5-4), and the coupling agent is a silane coupling agent.

* * * * *